(12) United States Patent
Feng et al.

(10) Patent No.: US 12,615,502 B2
(45) Date of Patent: Apr. 28, 2026

(54) ELECTRONIC DEVICES WITH COLLABORATIVE SYSTEM SELECTION CAPABILITIES

(71) Applicant: Apple Inc., Cupertino, CA (US)

(72) Inventors: Minghai Feng, Beijing (CN); Weiku Zhai, Beijing (CN); Tao Zeng, Shanghai (CN); Cheng Li, Shanghai (CN); Yaoqi Yan, Beijing (CN); Ying Zhang, Beijing (CN); Jishan Gao, Beijing (CN); Yong Ba, Beijing (CN); Ruirui Zong, Beijing (CN)

(73) Assignee: Apple Inc., Cupertino, CA (US)

( * ) Notice: Subject to any disclaimer, the term of this patent is extended or adjusted under 35 U.S.C. 154(b) by 964 days.

(21) Appl. No.: 17/860,704

(22) Filed: Jul. 8, 2022

(65) Prior Publication Data

US 2024/0015495 A1 Jan. 11, 2024

(51) Int. Cl.
*H04W 4/00* (2018.01)
*H04W 8/00* (2009.01)
(Continued)

(52) U.S. Cl.
CPC ........... *H04W 8/005* (2013.01); *H04W 48/18* (2013.01); *H04W 76/10* (2018.02)

(58) Field of Classification Search
CPC ..... H04W 8/005; H04W 76/10; H04W 48/18; H04W 8/00
(Continued)

(56) References Cited

U.S. PATENT DOCUMENTS 8,077,096 B2 * 12/2011 Chiang ................ H01Q 1/2266
343/702
8,351,849 B2 * 1/2013 Ying ...................... H04B 1/406
343/729
(Continued)

FOREIGN PATENT DOCUMENTS

WO WO-2015038236 A1 * 3/2015 ........ H04W 52/0241
WO 2021077124 A1 4/2021
WO 2021238406 A1 12/2021

OTHER PUBLICATIONS

ETSI, User Equipment (UE) procedures in idle mode and in RRC Inactive state, ETSI TS 138 304, Jan. 2020, pp. 1-31, vol. 15, ETSI, Sophia Antipolis, France.
(Continued)

*Primary Examiner* — Marceau Milord
(74) *Attorney, Agent, or Firm* — Treyz Law Group, P.C.; Michael H. Lyons

(57) ABSTRACT

An electronic device may include wireless circuitry with first and second receivers. Each receiver may include circuitry for receiving radio-frequency signals using a first radio access technology (RAT) and using second or additional RATs. The wireless circuitry may perform system selection in which the receivers attempt to acquire a signal transmitted by a base station using different RATs. The first receiver and the second receiver may concurrently perform system selection in which the first receiver performs a band scan over the first RAT while the second receiver concurrently performs a band scan over a second or additional RAT. Additional band scans may be performed as needed until a signal is acquired. Once a signal is acquired, the wireless circuitry may establish cellular communications with the wireless base station based on the acquired signal. This may minimize the amount of time required to begin cellular telephone communications in many situations.

20 Claims, 10 Drawing Sheets

(51) Int. Cl.
    *H04W 48/18*         (2009.01)
    *H04W 76/10*         (2018.01)

(58) Field of Classification Search
    USPC ......................................................... 370/329
    See application file for complete search history.

(56) References Cited

U.S. PATENT DOCUMENTS

| | | | | |
|---|---|---|---|---|
| 8,666,328 | B2 * | 3/2014 | Sanguinetti .......... | H04B 1/0057 |
| | | | | 455/84 |
| 8,811,922 | B2 * | 8/2014 | Mujtaba .............. | H04B 7/0602 |
| | | | | 455/552.1 |
| 9,930,714 | B2 * | 3/2018 | Burchill ............... | H04W 76/15 |
| 10,334,654 | B2 * | 6/2019 | Burchill ............... | H04W 76/15 |
| 10,462,805 | B2 * | 10/2019 | Belghoul .......... | H04W 72/0446 |
| 10,757,622 | B2 | 8/2020 | Srivastava et al. | |
| 11,129,239 | B2 * | 9/2021 | Liu ...................... | H04W 76/16 |
| 12,127,283 | B2 * | 10/2024 | Sen ...................... | H04W 24/10 |
| 12,376,152 | B2 * | 7/2025 | Xie ...................... | H04W 76/15 |
| 2011/0250926 | A1 * | 10/2011 | Wietfeldt .............. | H01Q 1/243 |
| | | | | 455/525 |
| 2012/0009887 | A1 * | 1/2012 | Sanguinetti ............. | H04B 1/18 |
| | | | | 455/78 |
| 2012/0046003 | A1 * | 2/2012 | Ying ...................... | H04B 1/406 |
| | | | | 455/90.2 |
| 2012/0164948 | A1 * | 6/2012 | Narasimha ........ | H04W 72/1215 |
| | | | | 455/63.1 |
| 2013/0148636 | A1 * | 6/2013 | Lum ................... | H04B 1/0067 |
| | | | | 370/336 |
| 2014/0066061 | A1 * | 3/2014 | Lou ....................... | H04W 48/16 |
| | | | | 455/434 |
| 2015/0079985 | A1 * | 3/2015 | Vuchula ................ | H04W 88/06 |
| | | | | 455/435.1 |
| 2016/0345246 | A1 * | 11/2016 | Xing .................... | H04W 8/005 |
| 2018/0092109 | A1 * | 3/2018 | Belghoul ............ | H04B 7/0632 |
| 2018/0279398 | A1 * | 9/2018 | Burchill ............ | H04W 72/1215 |
| 2019/0052328 | A1 * | 2/2019 | Akula .................... | H04L 5/006 |
| 2020/0037383 | A1 * | 1/2020 | Rico Alvarino ........ | H04W 8/24 |
| 2020/0059941 | A1 * | 2/2020 | Belghoul ............ | H04W 72/542 |
| 2020/0389937 | A1 * | 12/2020 | Liu ....................... | H04W 48/18 |
| 2021/0267005 | A1 * | 8/2021 | Gopal .................. | H04W 76/25 |
| 2023/0319716 | A1 * | 10/2023 | Sheik ................. | H04W 52/028 |
| | | | | 455/422.1 |

OTHER PUBLICATIONS

Giuseppe Caso et al., User-Centric Radio Access Technology Selection: A Survey of Game Theory Models and Multi-Agent Learning Algorithms, IEEE Access, Jun. 2021, pp. 84417-84464, vol. 9, IEEE, New York, New York, United States.

* cited by examiner

38

ELECTRONIC DEVICE ~10

12

CONTROL CIRCUITRY ~14

STORAGE CIRCUITRY ~16

PROCESSING CIRCUITRY ~18

INPUT/OUTPUT CIRCUITRY ~20

INPUT/OUTPUT DEVICES ~22

24

WIRELESS CIRCUITRY

36A~ SIM A    SIM B ~36B

}26

CELLULAR RADIO(S)

~34A    ~34B

RX1    RX2    • • •

32~    • • •    28

ANTENNA(S) ~30

~50

52A    52B    52C    52D

~48A    ~48B    ~48C    ~48D

ELECTRONIC DEVICES WITH COLLABORATIVE SYSTEM SELECTION CAPABILITIES

FIELD

This disclosure relates generally to electronic devices and, more particularly, to electronic devices with wireless circuitry.

BACKGROUND

Electronic devices can be provided with wireless capabilities. An electronic device with wireless capabilities has wireless circuitry that includes one or more antennas. The antennas can convey radio-frequency signals with one or more wireless base stations. If care is not taken, it can take excessively long for the wireless circuitry to acquire a satisfactory signal from a wireless base station. This can cause delays for the electronic device in wirelessly communicating with a network.

SUMMARY

An electronic device may include wireless circuitry controlled by one or more processors. The wireless circuitry may include one or more antennas. The wireless circuitry may include a first receiver and a second receiver. The wireless circuitry may include a subscriber identity module (SIM) or may include a first SIM (e.g., a dedicated data SIM (DDS)) and a second SIM (e.g., a non-dedicated-data SIM (nDDS)). Each receiver may include circuitry for receiving radio-frequency signals using a first (e.g., non-legacy, newer, or relatively fast) radio access technology (RAT) such as a 5G RAT. Each receiver may also include circuitry for receiving radio-frequency signals using one or more earlier (e.g., legacy, older, or relatively slow) RATs such as a 4G RAT, a 3G RAT, or a 2G RAT.

The wireless circuitry may attempt to establish cellular communications with a cellular telephone network. The wireless circuitry may perform system selection in which the wireless circuitry attempts to acquire a signal transmitted by base stations using different RATs based on a priority list or order. The first receiver and the second receiver may concurrently perform system selection using one SIM or both the first and second SIMs. Concurrent system selection may involve the first receiver performing a band scan of the first RAT while the second receiver concurrently performs a band scan of a second RAT. In some examples, the first RAT may be 5G and the second RAT may be 4G, 3G, or 2G (e.g., the first RAT may be a state-of-the-art or non-legacy RAT whereas the second RAT may be a legacy or non-state-of-the-art RAT so as to maintain backwards compatibility). Additionally or alternatively, concurrent system selection may involve one or both receivers concurrently scanning multiple bands of a single RAT such as a non-legacy RAT or a legacy RAT. One or both receivers may perform additional band scans using additional RATs as needed until a signal is acquired. Once a signal is acquired, the wireless circuitry may establish cellular communications with the wireless base station based on the acquired signal. Performing concurrent system selection using the first and second receivers may significantly reduce the amount of time required to begin cellular telephone communications in many operating situations and in many geographic regions.

An aspect of the disclosure provides an electronic device. The electronic device may include one or more antennas.

The electronic device may include a first receiver communicably coupled to the one or more antennas, the first receiver being configured to perform a first band scan of a first radio access technology (RAT) using the one or more antennas. The electronic device may include a second receiver communicably coupled to the one or more antennas, the second receiver being configured to perform a second band scan of a second RAT using the one or more antennas concurrent with the first receiver performing the first band scan of the first RAT, the second RAT being different from the first RAT or the same as the first RAT.

An aspect of the disclosure provides a method of operating an electronic device to establish cellular communications with a wireless base station. The method may include with a first receiver, listening for radio-frequency signals of a first radio access technology (RAT) while sweeping over first frequencies associated with the first RAT. The method may include with a second receiver, concurrent with the first receiver listening for the radio-frequency signals of the first RAT and sweeping over the first frequencies, listening for radio-frequency signals of a second RAT that is different from the first RAT while sweeping over second frequencies associated with the second RAT.

An aspect of the disclosure provides an electronic device. The electronic device can include one or more antennas. The electronic device can include a first receiver, wherein the first receiver is configured to use the one or more antennas to listen for radio-frequency signals of a first radio access technology (RAT) while sweeping over first frequencies associated with the first RAT. The electronic device can include a second receiver, wherein the second receiver is configured to use the one or more antennas to listen for radio-frequency signals of a second RAT while sweeping over second frequencies associated with the second RAT concurrent with the first receiver listening for radio-frequency signals of the first RAT and sweeping over the first frequencies, the second RAT being different from the first RAT. The electronic device can include one or more processors configured to establish cellular communications with a wireless base station based on a signal acquired by the first receiver while sweeping over the first frequencies or by the second receiver while sweeping over the second frequencies.

DETAILED DESCRIPTION

Figure 1:
FIG. 1 is a block diagram of an illustrative electronic device having wireless circuitry that performs system selection between different wireless technologies in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment. Electronic device 10 may be operated by an end user and may sometimes be referred to herein as user equipment (UE) or a UE device.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include nontransitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 may include one or more antennas 30. Wireless circuitry 24 may also one or more radios. The radios may include one or more cellular radios 28. Cellular radio(s) 28 may perform cellular telephone communications with one or more cellular telephone networks 48.

Cellular radio(s) 28 may include circuitry that operates on signals at baseband frequencies (e.g., baseband circuitry such as a baseband processor). Cellular radio(s) 28 may also include two or more receivers 34 such as a first receiver (RX1) 34A and a second receiver (RX2) 34B. Receivers 34A and 34B may be integrated into different cellular radios 28 or into the same cellular radio 28. While cellular radio(s) 28 also include one or more transmitters (e.g., one or more receivers 34 may be integrated with one or more transmitters in one or more transceivers on cellular radio(s) 28)), the transmitters have been omitted from FIG. 1 for the sake of clarity.

Each receiver 34 may include demodulation circuitry (e.g., integrated in one or more modems), mixer circuitry (e.g., one or more downconverters that downconvert radio-frequency signals to baseband), amplifier circuitry (e.g., one or more low noise amplifiers), analog-to-digital converter (ADC) circuitry (e.g., one or more ADCs), filter circuitry, switching circuitry, control paths, power supply paths, signal paths (e.g., radio-frequency transmission lines, intermediate frequency transmission lines, baseband signal lines, etc.), and/or any other circuitry for receiving radio-frequency signals using one or more antennas 30. The components of each cellular radio 28 in wireless circuitry 24 may be mounted onto a respective substrate or integrated into a respective integrated circuit, chip, package, or system-on-chip (SOC). If desired, the components of multiple cellular radios 28 may share a single substrate, integrated circuit, chip, package, or SOC. Similarly, the components of each receiver 34 in cellular radio(s) 28 may be mounted onto a respective substrate or integrated into a respective integrated circuit, chip, package, or system-on-chip (SOC) or, if desired, the components of multiple receivers 34 may share a single substrate, integrated circuit, chip, package, or SOC.

Antenna(s) 30 may be formed using any desired antenna structures. For example, antenna(s) 30 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antenna(s) 30 over time.

Transceiver circuitry in cellular radio(s) 28 may convey radio-frequency signals using one or more antennas 30 (e.g., antenna(s) 30 may convey the radio-frequency signals for the transceiver circuitry). Receivers 34 may receive radio-frequency signals using one or more antennas 30. The term "convey radio-frequency signals" as used herein means the transmission and/or reception of the radio-frequency signals (e.g., for performing unidirectional and/or bidirectional wireless communications with external wireless communications equipment). Antenna(s) 30 may transmit the radio-frequency signals by radiating the radio-frequency signals into free space (or to free space through intervening device structures such as a dielectric cover layer). Antenna(s) 30 may additionally or alternatively receive the radio-frequency signals from free space (e.g., through intervening devices structures such as a dielectric cover layer). The transmission and reception of radio-frequency signals by antenna(s) each involve the excitation or resonance of antenna currents on an antenna resonating element in the antenna by the radio-frequency signals within the frequency band(s) of operation of the antenna.

Cellular radio(s) 28 may be coupled to one or more antennas 30 over one or more radio-frequency transmission lines 32. Radio-frequency transmission lines 32 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission lines 32 may be integrated into rigid and/or flexible printed circuit boards if desired. Receiver 34A and receiver 34B may be coupled to one or more antennas 30 over different respective radio-frequency transmission lines 32 or one or more radio-frequency transmission lines 32 may be shared between receivers 34A and 34B if desired. Radio-frequency front end (RFFE) modules may be interposed on one or more radio-frequency transmission lines 32. The radio-frequency front end modules may include substrates, integrated circuits, chips, or packages that are separate from cellular radio(s) 28 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 32.

The radios in wireless circuitry 24 may use antenna(s) 30 to transmit and/or receive radio-frequency signals within different frequency bands at radio frequencies (sometimes referred to herein as communications bands or simply as a "bands"). Receivers 34A and 34B may, for example, use antenna(s) 30 to receive radio-frequency signals within cellular telephone frequency bands. The cellular telephone frequency bands may include 3GPP Fifth Generation (5G) New Radio (NR) bands (e.g., 5G NR Frequency Range 1 (FR1) bands under 10 GHz and/or NR Frequency Range 2 (FR2) bands between about 20 and 60 GHz), Fourth Generation (4G) Long-Term Evolution (LTE) bands (e.g., at frequencies below about 6 GHz such as in a cellular low band, low-midband, midband, high band, and/or ultra-high band), Third Generation (3G) wideband code division multiple access (WCDMA) bands, and/or Second Generation (2G) Global System for Mobile Communications (GSM) bands. The 5G NR bands may sometimes be referred to herein more simply as 5G bands, NR bands, or non-legacy bands (e.g., state-of-the-art bands, newer bands, or relatively fast bands). The 4G LTE bands may sometimes be referred to herein more simply as 4G bands or LTE bands. The 3G WCDMA bands may sometimes be referred to herein more simply as 3G bands, WCDMA bands, or W bands. The 2G GSM bands may sometimes be referred to herein more simply as 2G bands, GSM bands, or G bands. The 4G, 3G, and 2G bands may sometimes be referred to collectively herein as legacy bands (e.g., the legacy bands, older bands, or slower bands than 5G NR bands include 4G, 3G, and 2G bands).

Each receiver 34 may include circuitry that receives radio-frequency signals according to one or more radio access technologies (RATs). Each RAT determines the physical connection methodology for the circuit components in the receiver (e.g., the PHY layer processing of the receiver). Each RAT may sometimes be referred to herein as a wireless technology. The RATs (wireless technologies) implemented by receivers 34 may include a 5G NR RAT (wireless technology) that supports reception of radio-frequency signals in one or more NR bands, a 4G LTE RAT (wireless technology) that supports reception of radio-frequency signals in one or more 4G bands, a 3G WCDMA RAT (wireless technology) that support reception of radio-frequency signals in one or more 3G bands, and/or a 2G GSM RAT (wireless technology) that supports reception of radio-frequency signals in one or more 2G bands. The 5G NR RAT may sometimes be referred to herein more simply as the 5G, NR, or non-legacy (e.g., relatively new or relatively fast) RAT or wireless technology. The 4G LTE RAT may sometimes be referred to herein more simply as the 4G or LTE RAT or wireless technology. The 3G WCDMA RAT may sometimes be referred to herein more simply as the 3G or WCDMA RAT or wireless technology. The 2G GSM RAT may sometimes be referred to herein more simply as the 2G or GSM RAT or wireless technology. The 4G, 3G, and 2G RATs may sometimes be referred to collectively herein as legacy RATs or legacy wireless technologies (e.g., relatively old or relatively slow RATs). This is illustrative and non-limiting. The non-legacy RAT as described herein need not be 5G and may, in general, be any first RAT (e.g., a relatively fast or new RAT) such as a RAT other than 5G or subsequent to 5G. In these examples, the legacy RATs may include any desired second or additional RATs (e.g., a relatively slow or old RAT that is earlier and/or slower than the first RAT), and may include 5G.

Receiver 34A may include circuitry that implements the 5G, 4G, 3G, and/or 2G RAT. Put differently, receiver 34A may receive radio-frequency signals in any combination of 5G, 4G, 3G, and/or 2G bands. Similarly, receiver 34B may include circuitry that implements the 5G, 4G, 3G, and/or 2G RAT. Put differently, receiver 34B may receive radio-frequency signals in any combination of 5G, 4G, 3G, and/or 2G bands. While referred to herein as receivers, the receivers may be integrated into one or more transceivers that includes transmitter circuitry that transmits radio-frequency signals in one or more of these bands.

Although not shown in FIG. 1 for the sake of clarity, wireless circuitry 24 may include other radio(s) that transmit and/or receive radio-frequency signals in wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB)

frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Electronic device 10 may operate in a wireless communications system 38 (sometimes referred to herein as wireless network 38). Wireless communications system 38 may include one or more cellular telephone networks 48. Each cellular telephone network 48 may convey radio-frequency signals using a corresponding RAT or wireless technology. For example, wireless communications system 38 may include a first cellular telephone network 48A that conveys radio-frequency signals in NR bands (using the NR RAT), a second cellular telephone network 48B that conveys radio-frequency signals in 4G bands (using the 4G RAT), a third cellular telephone network 48C that conveys radio-frequency signals in 3G bands (using the 3G RAT), and/or a fourth cellular telephone network 48D that conveys radio-frequency signals in 2G bands (using the 2G RAT).

Each cellular telephone network 48 may include one or more corresponding wireless base stations 52. Each base station 52 may convey radio-frequency signals with one or more UE devices such as device 10 when the UE devices are located within the cell or coverage area of the base station. Cellular telephone network 48A may include one or more base stations 52A that convey radio-frequency signals in NR bands. Cellular telephone network 48A may therefore sometimes be referred to herein as 5G network 48A or NR network 48A. The radio-frequency signals conveyed in NR bands by NR network 48A (e.g., according to an NR protocol) may sometimes be referred to herein as 5G signals or NR signals. Cellular telephone network 48B may include one or more base stations 52B that convey radio-frequency signals in 4G bands. Cellular telephone network 48B may therefore sometimes be referred to herein as 4G network 48B or LTE network 48B. The radio-frequency signals conveyed in 4G bands by 4G network 48B (e.g., according to a 4G protocol) may sometimes be referred to herein as 4G signals or LTE signals. Cellular telephone network 48C may include one or more base stations 52C that convey radio-frequency signals in 3G bands. Cellular telephone network 48C may therefore sometimes be referred to herein as 3G network 48C or WCDMA network 48C. The radio-frequency signals conveyed in 3G bands by 3G network 48C (e.g., according to a 3G protocol) may sometimes be referred to herein as 3G signals or WCDMA signals. Cellular telephone network 48D may include one or more base stations 52D that convey radio-frequency signals in 2G bands. Cellular telephone network 48D may therefore sometimes be referred to herein as 2G network 48D or GSM network 48D. The radio-frequency signals conveyed in 2G bands by 2G network 48D (e.g., according to a 2G protocol) may sometimes be referred to herein as 2G signals or GSM signals. Cellular telephone networks 48B-D may sometimes be referred to herein as second networks, relatively slow networks, relatively old networks, or legacy networks (whereas cellular telephone network 48A is a first network, a relatively fast network, a relatively new network, or a non-legacy network).

Each cellular telephone network may include one or more network nodes coupled to its base station(s) 52. The network nodes may include network switches, routers, modems, end hosts, servers, controllers, etc. The network nodes may be coupled to other wired and/or wireless networks (e.g., the Internet). A UE device such as device 10 may transmit wireless data (e.g., communications data packets) to another UE device and/or may receive wireless data from another UE device in wireless communications system 38 via one or more of cellular telephone networks 48. Each of cellular telephone networks 48A-D may be managed, operated, and/or controlled by a respective cellular network carrier (sometimes referred to herein as a cellular carrier, network carrier, wireless carrier, carrier, network service provider, cellular service provider, or service provider). If desired, more than one cellular network carrier may manage, operate, and/or control any one of cellular telephone networks 48A-D. Two or more (e.g., all) of cellular telephone networks 48A-D may be managed, operated, and/or controlled by the same cellular network carrier.

As shown in FIG. 1, cellular radio(s) 28 may use antenna(s) 30 to convey radio-frequency signals 50 with one or more of cellular telephone networks 48A-D. As such, receivers 34A and 34B may receive radio-frequency signals 50 from one or more base stations 52 of one or more of cellular telephone networks 48A-D. Wireless circuitry 24 may include one or more subscriber identity modules (SIMs) 36 that are used in communicating with one or more of cellular networks 48A-D. Each SIM may be associated (e.g., registered) with a corresponding cellular network carrier and may provide wireless access to the cellular network of the cellular network carrier to device 10. SIMs 36 may be integrated or built into device 10 or may, if desired, be removable (e.g., so a user can swap SIMs into device 10 based on which cellular network carrier the user wishes to provide cellular coverage to device 10). SIMs 36 may sometimes also be referred to as SIM cards. The SIM(s) 36 installed in device 10 may be communicably coupled to cellular radio(s) 28 over SIM interface 26. Receivers 34A and 34B may receive subscriber identification information from SIM(s) 36 over SIM interface 26 and may receive radio-frequency signals 50 from cellular telephone network(s) 48 using one or more of SIM(s) 36 (e.g., using the subscriber identification information). The cellular telephone network(s) 48 may use the subscriber information to verify that device 10 has appropriate access to the network and to register device 10 and its communications to one or more subscribers identified by the subscriber information, for example.

In the example of FIG. 1, SIMs 36 include a first SIM 36A (SIM A) and a second SIM 36B (SIM B). When two SIMs 36 such as SIM 36A and SIM 36B are installed on device 10, cellular radio(s) 28 may perform wireless communications using Multi-SIM (MSIM) or Dual SIM Dual Standby (DSDS) processes (e.g., in MSIM or DSDS modes). In these examples, SIM 36A may be a dedicated data SIM (DDS) whereas SIM 36B is a non-dedicated-data SIM (nDDS). In other examples, device 10 may include only a single SIM such as SIM 36A (e.g., SIM 36B may be omitted). In these examples, cellular radio(s) 28 may perform wireless communications using single SIM (SSIM) processes (e.g., in a SSIM mode).

While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of cellular radio(s) 28 and/or one or more of receivers 34. The baseband circuitry or other processing circuitry on cellular radio(s) 28 and/or receiver(s) 34 may, for example, access a communication protocol stack on control circuitry 14 (e.g., storage circuitry 16) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum (NAS) layer. If desired, the PHY layer operations may additionally or alternatively be performed by radio-frequency (RF) interface circuitry in wireless circuitry 24.

In general, 5G communications offer higher data rates and overall wireless communications performance than communications using other (e.g., slower or older) RATs such as 4G communications. Similarly, 4G communications generally offer higher data rates and overall wireless communications performance than 3G communications, which offer superior wireless performance than 2G communications. It may be desirable for device 10 to maximize its data rate and wireless communications performance at any given time. However, device 10 may only use a given wireless technology when device 10 is located within the cell or coverage area of a base station that operates according to that wireless technology and when the base station is active. In some situations, device 10 may not be located within a cell or coverage area of 5G network 48A, or 5G network 48A may otherwise be unavailable. In these cases, device 10 may maximize its data rate and wireless communications performance by performing 4G communications, assuming device 10 is located within a cell or coverage area of 4G network 48B. If 4G network 48B is not available, device 10 may then revert to 3G communications with 3G network 48C and then 2G communications with 2G network 48D. As device 10 moves over time and different areas have different levels of wireless coverage in different wireless technologies, device 10 may need to change the RAT used for communications over time in a manner that maximizes overall data throughput and wireless performance level.

As receivers 34 support multiple RATs, wireless circuitry 24 performs a system selection (SS) procedure when device 10 begins cellular communications. The system selection procedure may involve searching for and selecting a cellular telephone network 48 (i.e., a cellular system) with which to perform cellular communications (e.g., with which to convey wireless data). Device 10 may not have a priori information about the particular cellular telephone network 48 or the corresponding frequencies that are available at its current location at any given time. As such, the system selection procedure may involve performing one or more sweeps over frequencies or frequency bands (sometimes referred to herein as a band scan or frequency scan). In a band scan, wireless circuitry 24 receives radio-frequency signals while sweeping through different frequencies until an adequate signal transmitted by one of cellular networks 48A-D is found (e.g., a downlink reference signal, beacon signal, or other signal having a signal quality, received power level, or other wireless performance metric value that exceeds a minimum threshold value). Once an adequate signal is found, wireless circuitry 24 may camp (dwell) on the found signal's frequency, may register with cellular telephone network 48 that transmitted the found signal (e.g., initially using the found signal's frequency), may be scheduled for communications by the cellular telephone network 48, and may then perform regular cellular communications with the cellular telephone network 48 (e.g., by conveying wireless communications data with the cellular telephone network using time and frequency resources as assigned to device 10 in the schedule).

As different RATs offer different maximum data rates and different levels of wireless performance and it is desirable for wireless circuitry 24 to maximize its data rate and wireless performance, the system selection may favor NR communications with NR network 48A over communications with cellular telephone networks 48B-D when NR network 48A is available at the current location of device 10. Similarly, the system selection may favor 4G communications to 3G communications when NR communications are unavailable and may favor 3G communications to 2G communications when NR and 4G communications are unavailable. The order in which different RATs are preferred over the others for cellular communications may be determined by a corresponding priority list. The priority list may depend on the particular region in which device 10 is located, the requirements of device 10, etc.

In some implementations, wireless circuitry 24 performs a time-sequential system selection in which a single receiver performs a band scan over NR bands (using the NR RAT). If no adequate NR signal is found, the same receiver then performs a band scan over 4G bands (using the 4G RAT). If no adequate NR 4G signal is found, then the same receiver performs a band scan over 3G bands (using the 3G RAT). If no adequate 2G signal is found, then the same receiver performs a band scan over 2G bands (using the 2G RAT). In some regions, the single receiver may instead use a RAT acquisition order of 4G to NR to 3G to 2G, as another example. This sequential time division scanning process is repeated until a suitable signal is acquired, and the receiver then selects the RAT associated with the acquired signal for subsequent cellular communications. While such a sequential time division scanning process helps to ensure that an adequate signal is eventually found, it can take an excessive amount of time to acquire a suitable signal and then to establish communications with the corresponding cellular telephone network. Such a process can therefore cause excessive and noticeable delays in the amount of time required for device 10 to begin to access a suitable cellular telephone network and to begin to perform cellular communications.

On the other hand, receiver 34A and receiver 34B in cellular radio(s) 28 may have circuitry that is capable of concurrently receiving radio-frequency signals 50 using both a first RAT such as the NR RAT and a second RAT such as another RAT (e.g., an earlier or slower RAT). For example, receiver 34A may receive signals in an NR band while receiver 34B concurrently receives signals in a 4G, 3G, or 2G band. To minimize system selection time while maximizing wireless performance, receiver 34A and 34B may concurrently perform system selection using different RATs (wireless technologies).

Figure 2:
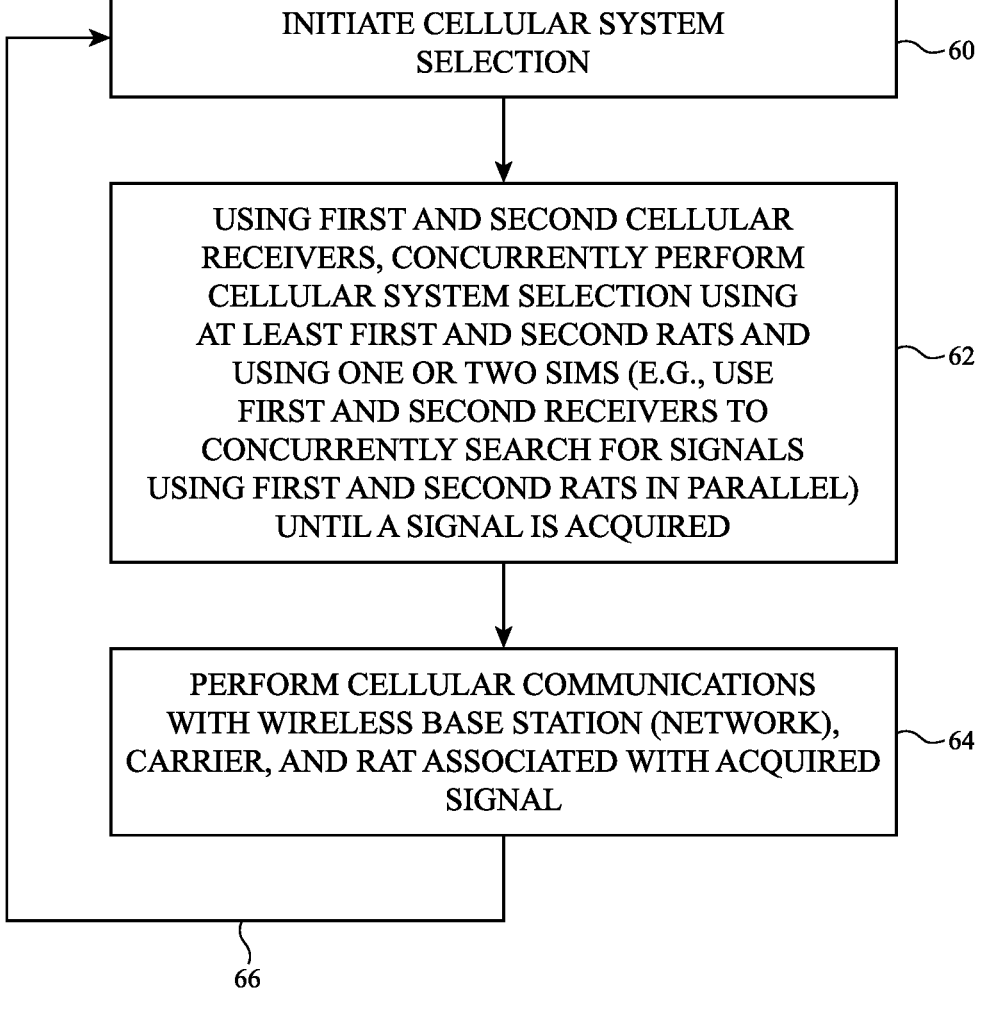
FIG. 2 is a flow chart of illustrative operations involved in using two receivers to concurrently perform system selection from different wireless technologies in accordance with some embodiments.

FIG. 2 is a flow chart of illustrative operations that may be performed by wireless circuitry 24 to concurrently perform system selection using different RATs. At operation 60, wireless circuitry 24 may initiate system selection. Wireless circuitry 24 may initiate system selection upon power on or boot up of device 10, upon turning off an airplane mode of device 10, upon activation of cellular radio(s) 28, upon entering a coverage area of an active cellular telephone network 48 after previously not being in the coverage area of an active cellular telephone network, upon receipt of a user input, periodically, at predetermined times, in response to a command issued by an application running on device 10, or upon the occurrence of any other desired trigger condition.

At operation 62, first receiver 34A and second receiver 34B may concurrently perform system selection using at least two different RATs and using one or both of SIMs 36A and 36B. There may be at least one time period during which first receiver 34A performs system selection (e.g., a band scan) using a first RAT (e.g., an NR band scan using the NR RAT) while second receiver 34B concurrently performs system selection (e.g., a band scan) in parallel using a second RAT (e.g., a 4G, 3G, or 2G band scan using the 4G, 3G, or 2G RAT). The system selection and the corresponding band scans may be performed until a suitable signal is acquired using one of the RATs (e.g., a signal having a wireless performance metric exceeding a minimum threshold value or falling within a range of acceptable values). The RAT of the acquired signal may sometimes be referred to herein as the selected system or the selected RAT. This concurrent system selection may sometimes be referred to herein as collaborative system selection. By performing system selection concurrently using receiver 34A and receiver 34B (e.g., concurrent band scans using different RATs), the time required to acquire the signal may be substantially less than when a single receiver performs band scans in a sequence of RATs. Once a signal is acquired, processing may proceed to operation 64.

At operation 64, wireless circuitry 24 may perform cellular communications with a base station 52 of the cellular telephone network 48 that produced the acquired signal (e.g., using the corresponding RAT and a frequency band associated with communications using the RAT). The cellular communications may involve the transmission or reception of wireless data (e.g., data packets). The cellular communications may be performed according to a communications schedule assigned to device 10 by the cellular telephone network that produced the acquired signal. If desired, a newer system may be selected once it becomes available (e.g., if device 10 enters the coverage area of an NR network 48A after previously acquiring a signal from 4G network 48B). Processing may loop back to operation 60 via path 66 as needed.

Figure 3:
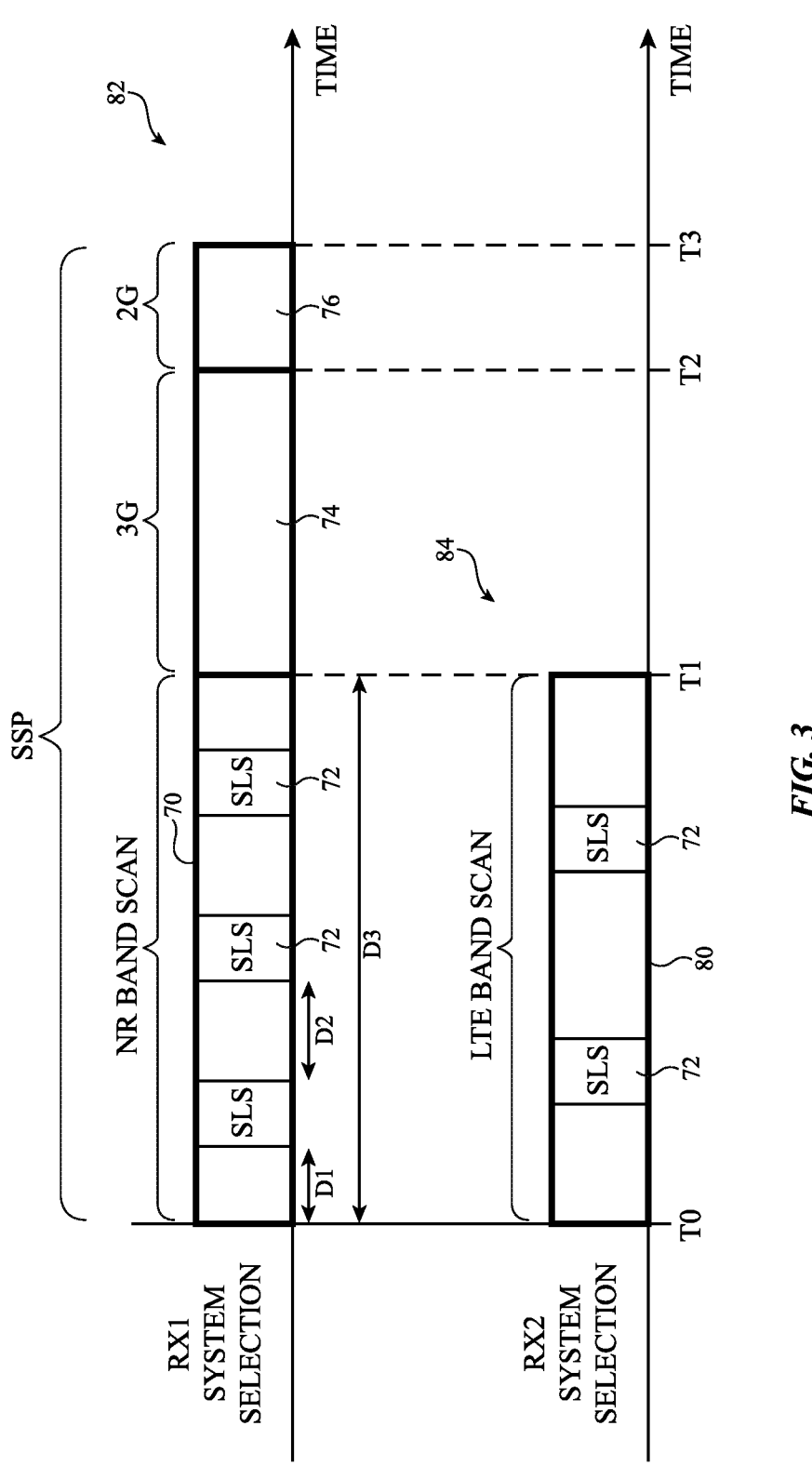
FIG. 3 includes illustrative timing diagrams showing how first and second receivers may concurrently perform system selection from different wireless technologies using a single subscriber identity module (SIM) in accordance with some embodiments.

Receiver 34A and receiver 34B may concurrently perform system selection with a first RAT (e.g., the NR RAT) and a second RAT (e.g., another or slower/earlier RAT) using a single SIM 36 or using both SIMs 36A and 36B. FIG. 3 depicts timing diagrams showing one example of how receiver 34A and receiver 34B may concurrently perform system selection using a single SIM 36 (e.g., in an SSIM mode). As shown in FIG. 3, timing diagram 82 charts the system selection procedure that may be performed by receiver 34A (RX1) using a given SIM 36. Timing diagram 84 charts the system selection procedure that may be performed by receiver 34B (RX2) using the given SIM 36. The diagramed system selection procedures may be performed while processing operation 62 of FIG. 2, for example.

At time T0, receiver 34A may begin to perform band scans using a series of RATs in order of decreasing priority as determined by a corresponding priority list (e.g., from a RAT associated with a highest data rate to a RAT associated with a lowest data rate). During block 70 from time T0 to time T1, receiver 34A may perform an NR band scan over NR bands using the NR RAT (e.g., NR SS). The NR band scan may sometimes be referred to herein as a 5G band scan. The NR band scans as described herein may be equivalently replaced with band scans over any desired bands of any desired first RAT (e.g., a state-of-the art, non-legacy, relatively fast, and/or relatively new RAT including potential RATs subsequent to or faster than NR).

The NR band scans described herein may, for example, involve sweeping the receiver and the corresponding antenna(s) 30 over different frequencies in the NR bands (e.g., over different NR bands), receiving or listening for radio-frequency signals at each of the frequencies, generating (e.g., measuring, gathering, computing, etc.) wireless performance metric data associated with received signals at each of the frequencies, comparing the generated wireless performance metric data to a threshold or range of acceptable values, and camping (dwelling) on a frequency in the scan when the wireless performance metric data exceeds the threshold or falls within the range of acceptable values. The receiver may camp on the frequency after finishing the scan or immediately without finishing the scan. The wireless performance metric data may include receive signal strength, error rate, symbol rate, received power level, received signal strength indicator, signal-to-noise ratio, or any other desired wireless performance metric values. The band scan may end after a predetermined time. For example, the NR band scan (e.g., block may have a duration D3 (T1–T0). The band scan may include one or more store list scan (SLS) periods 72. During SLS periods 72, the receiver may store the frequencies in the NR bands that have already been scanned or swept over. The first SLS 72 in the NR band scan may begin after duration D1 from time T0 (e.g., 2 seconds). Each subsequent SLS 72 may be separated from the previous SLS in the NR band scan by duration D2 (e.g., 10 seconds).

Listening for radio-frequency signals as described herein may involve receiver 34A or 34B actively using a corresponding RAT (e.g., receiver circuitry organized according to the RAT) and a corresponding SIM to receive electromagnetic energy (e.g., while active and powered on) at a corresponding frequency using antenna(s) 40, amplifying the received electromagnetic energy (e.g., using a low noise amplifier), attempting to downconvert the received electromagnetic energy, attempting to demodulate or decode radio-frequency signals in the received electromagnetic energy, attempting to convert radio-frequency signals in the received electromagnetic energy into the digital domain, etc. While listening for radio-frequency signals, when the received electromagnetic energy includes radio-frequency signals transmitted by a base station 52, receiver 34A or 34B may be referred to herein as receiving the radio-frequency signals.

At time T0, receiver 34B may begin to perform a band scan using a second RAT (e.g., a RAT that is older or slower than the first RAT which is NR in this example) concurrent with the NR band scan performed by receiver 34A. For example, during block 80 from time T0 to time T1, receiver 34B may perform an LTE band scan (sometimes referred to herein as a 4G band scan) over 4G bands using the 4G RAT (e.g., LTE SS).

The LTE band scans described herein may, for example, involve sweeping the receiver and the corresponding antenna(s) 30 over different frequencies in the 4G bands (e.g., over different 4G bands), receiving or listening for radio-frequency signals at each of the frequencies, generating (e.g., measuring, gathering, computing, etc.) wireless performance metric data associated with received signals at each of the frequencies, comparing the generated wireless performance metric data to a threshold or range of acceptable values, and camping (dwelling) on a frequency in the scan when the wireless performance metric data exceeds the threshold or falls within the range of acceptable values. The receiver may camp on the frequency after finishing the scan or immediately without finishing the scan. The wireless performance metric data may include receive signal strength, error rate, symbol rate, received power level, received signal strength indicator, signal-to-noise ratio, or any other desired wireless performance metric values. The band scan may end after a predetermined time. For example, the LTE band scan (e.g., block 80) may have a duration D3 (T1–T0). The LTE band scan may include one or more store list scan (SLS) periods 72.

If no signal is acquired by receiver 34A during the NR band scan (block 70) and no signal is acquired by receiver 34B during the concurrent LTE band scan (block 80), receiver 34A may begin to perform a band scan using a third (e.g., a slower/earlier) RAT. For example, during block 74 from time T1 to time T2, receiver 34A may perform a 3G band scan over 3G bands using the 3G RAT (e.g., 3G SS). Since receiver 34B would have acquired a signal during the LTE band scan of block 80 were a 4G network 48B available, receiver 34A may jump from the NR band scan to the 3G band scan without first performing an LTE band scan.

The 3G band scans described herein may, for example, involve sweeping the receiver and the corresponding antenna(s) 30 over different frequencies in the 3G bands (e.g., over different 3G bands), receiving or listening for radio-frequency signals at each of the frequencies, generating (e.g., measuring, gathering, computing, etc.) wireless performance metric data associated with received signals at each of the frequencies, comparing the generated wireless performance metric data to a threshold or range of acceptable values, and camping (dwelling) on a frequency in the scan when the wireless performance metric data exceeds the threshold or falls within the range of acceptable values. The receiver may camp on the frequency after finishing the scan or immediately without finishing the scan. The wireless performance metric data may include receive signal strength, error rate, symbol rate, received power level, received signal strength indicator, signal-to-noise ratio, or any other desired wireless performance metric values. The band scan may end after a predetermined time.

If no signal is acquired by receiver 34A during the 3G band scan (block 74), receiver 34A may begin to perform a band scan using a fourth (e.g., a slower/earlier) RAT. For example, during block 76 from time T2 to time T3, receiver 34A may perform a 2G band scan over 2G bands using the 2G RAT (e.g., 2G SS).

The 2G band scans described herein may, for example, involve sweeping the receiver and the corresponding antenna(s) 30 over different frequencies in the 2G bands (e.g., over different G bands), receiving or listening for radio-frequency signals at each of the frequencies, generating (e.g., measuring, gathering, computing, etc.) wireless performance metric data associated with received signals at each of the frequencies, comparing the generated wireless performance metric data to a threshold or range of acceptable values, and camping (dwelling) on a frequency in the scan when the wireless performance metric data exceeds the threshold or falls within the range of acceptable values. The receiver may camp on the frequency after finishing the scan or immediately without finishing the scan. The wireless performance metric data may include receive signal strength, error rate, symbol rate, received power level, received signal strength indicator, signal-to-noise ratio, or any other desired wireless performance metric values. The band scan may end after a predetermined time. If no signal is acquired by receiver 34A during the 2G band scan, the concurrent NR and LTE band scans may begin again (e.g., timing and processing may revert to time T0). In other words, receivers 34A and 34B may perform cyclical band scans this way during repeating system selection periods SSP until a signal is acquired.

Implementations where a single receiver such as receiver 34A performs a series of band scans over the RATs in order of decreasing priority (e.g., a NR band scan and then, if no signal is acquired, a 4G band scan and then, if no signal is acquired, a 3G band scan and then, if no signal is acquired, a 2G band scan) can cause device 10 to take an excessive amount of time to acquire a signal. For example, when device 10 is at a location without NR coverage but with LTE coverage, device 10 may be incapable of acquiring an LTE signal until at least after time T1, because the LTE band scan would not begin until after completion of the NR band scan. However, since receiver 34B performs the LTE band scan (block 80) while receiver 34A concurrently performs the NR band scan (block 70), receiver 34B will acquire the LTE signal prior to time T1, thereby allowing cellular communications to begin more rapidly. In other words, cellular radio(s) 28 on device 10 need not wait until completion of the NR band scan by receiver 34A before acquiring a signal and beginning cellular telephone communications with another network. In situations where NR network 48A is unavailable, the implementation of FIG. 3 therefore allows device 10 to connect to 4G network 48B (or another earlier/slower network) more quickly than when a single receiver performs sequential band scans across RATs (e.g., as much as twice as quickly).

The example of FIG. 3 is illustrative and non-limiting. Receiver 34B may perform a band scan using any desired RAT (e.g., a RAT that is earlier/slower than the first RAT) between times T0 and T1 while receiver 34A concurrently performs the NR band scan (or a band scan over any desired first RAT). The NR band scan may be a NR standalone (SA) band scan or a NR non-standalone (NSA) band scan. The receivers may, for example, perform NR communications in an SA mode or an NSA mode. In the NSA mode, the receiver receives LTE signals at an anchor frequency while concurrently receiving supplemental signals at NR frequencies when able. In the SA mode, the receiver receives signals at NR frequencies without an LTE anchor. In some regions (e.g., China), device 10 may need to search NR/SA bands prior to other (e.g., slower or earlier) RATs to meet the specification requirements of the region. However, NR/SA coverage is often poor in these regions. As such, in non-SA coverage scenarios, NR/SA system selection time is wasted and device 10 needs to use a long amount of time for cell camp-on. The concurrent system selection procedure shown in FIG. 3 may serve to reduce these times.

In the example of FIG. 3, receiver 34A performs an NR band scan while receiver 34B concurrently performs an LTE (or other earlier/slower RAT) band scan. When no NR network 48A available, this may greatly reduce the amount of time required to acquire a signal from 4G network 48B and to begin wireless communications with 4G network 48B. In situations where NR network 48A is available, cellular radio(s) 28 may perform different operations depending on whether an NR signal is first acquired by receiver 34A during the NR band scan or an LTE signal is first acquired by receiver 34B during the LTE band scan.

Figure 4:
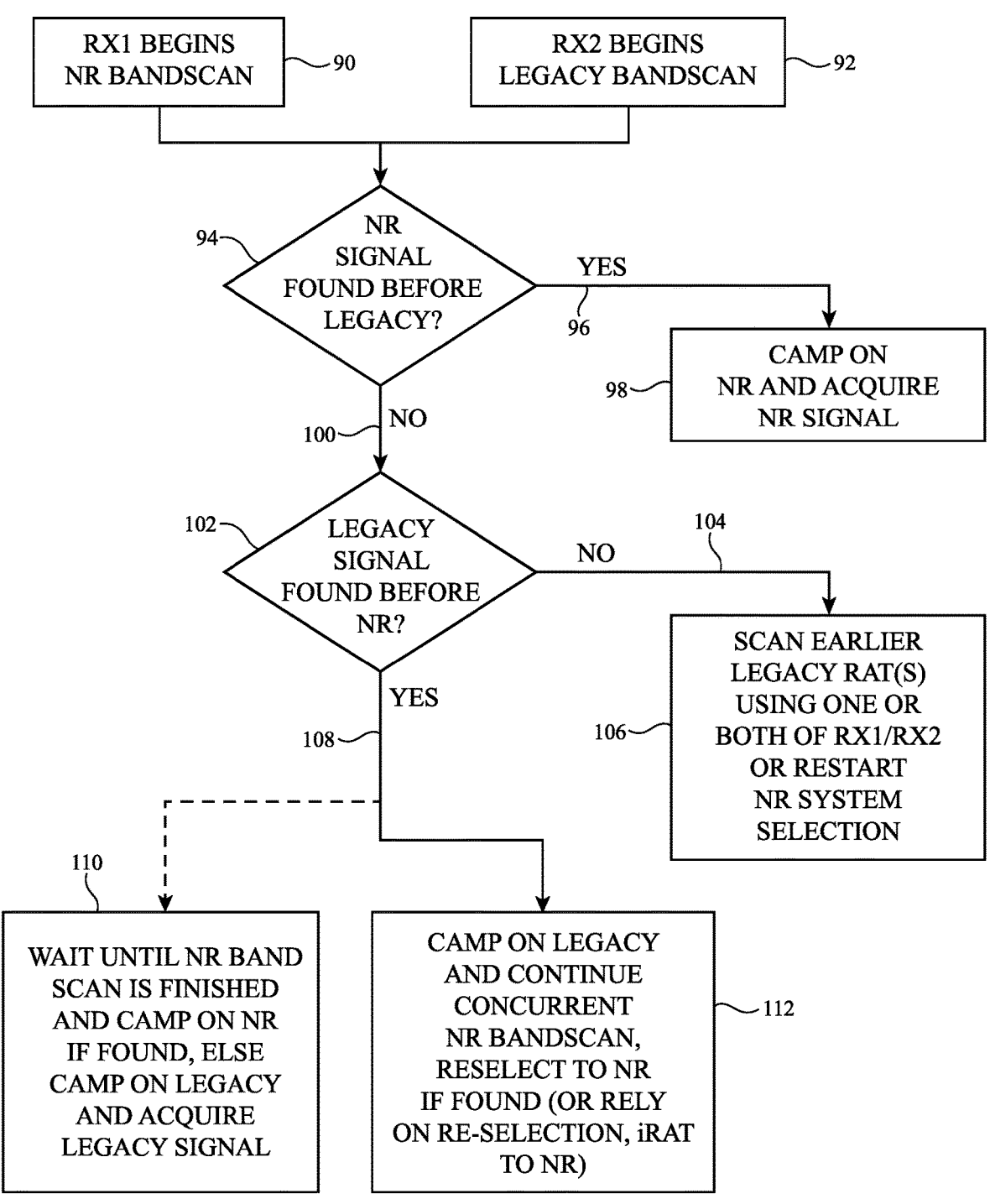
FIG. 4 is a flow chart of illustrative operations that may be performed using first and second receivers to concurrently perform system selection from different wireless technologies using a single SIM in accordance with some embodiments.

FIG. 4 is a flow chart of illustrative operations that may be performed by receiver 34A and receiver 34B to handle situations in which both an NR signal and an LTE signal (or a signal of another RAT) are acquired during the parallel (concurrent) NR band scan by receiver 34A and LTE/band scan by receiver 34B.

At operation 90, receiver 34A may begin the NR band scan. The NR band scan may be the NR band scan of block 70 in FIG. 3 or may be another NR band scan performed under a different timing procedure as described herein (e.g., in an SSIM, MSIM, or DSDS mode).

At operation 92, receiver 34B may begin a concurrent band scan using a slower/earlier RAT (e.g., concurrent with the NR band scan of operation 90). The band scan may be the LTE band scan of block 80 in FIG. 3 or may be another LTE or band scan over an earlier or slower RAT performed under a different timing procedure as described herein (e.g., in an SSIM, MSIM, or DSDS mode). Operations 90 and 92 may be performed concurrently in parallel (e.g., simultaneously).

In the example of FIG. 4, device 10 is at a location with coverage from both NR network 48A and a slower/earlier RAT cellular telephone network (e.g., one of cellular telephone networks 48B-D of FIG. 1). The NR band scan may acquire an NR signal using the NR. The other band scan may also acquire a signal using the slower/earlier RAT.

If the NR signal was acquired or found by receiver 34A during the NR band scan prior to the signal being acquired or found by receiver 34B during the band scan for the slower/earlier RAT (operation 94), processing may proceed from operation 94 to operation 98 via path 96. At operation 98, receiver 34A may camp on the frequency of the acquired NR signal and may begin to communicate with NR network 48A. This may maximize the data rate and wireless performance of device 10 since the NR network supports higher data rate and wireless performance than earlier/slower networks.

If receiver 34A does not find or acquire the NR signal prior to receiver 34B acquiring or finding the signal of the slower/earlier RAT during its band scan, processing may proceed to operation 102 via path 100. If a signal of the slower/earlier RAT was not acquired or found during the legacy band scan, processing may proceed to operation 106 via path 104. At operation 106, receiver 34A and/or receiver 34B may begin band scans of earlier RATs until a signal is acquired (e.g., as shown for receiver 34A by blocks 74 and 76 of FIG. 3) and/or may restart the NR and/or band scans over slower/earlier RATs (e.g., by returning to operations 90 and 92).

If receiver 34B finds or acquires the signal of the slower/earlier RAT during its band scan prior to receiver 34A acquiring or finding an NR signal during the NR band scan, processing may proceed from operation 102 to operation 112 or alternatively to operation 110 via path 108. At operation 112, receiver 34B may camp on the frequency of the signal acquired during the its band scan (e.g., may continue to receive signals using the earlier/slower RAT at the same frequency). If desired, cellular radio(s) 28 may begin to convey wireless data with the earlier/slower cellular telephone network that transmitted the acquired signal of the earlier/slower RAT (e.g., at the frequency of the acquired legacy signal). At the same time, receiver 34A may continue the NR band scan concurrent with receiver 34B camping on the frequency of the acquired signal of the earlier/slower RAT. If receiver 34A finds or acquires an NR signal during the continued NR band scan, then cellular radio(s) 28 may re-select the NR RAT, may camp on the frequency of the acquired NR signal, and may begin wireless communications with NR network 48A. If the receiver does not find or acquire the NR signal during the continued NR band scan, cellular radio(s) 28 may use the earlier/slower cellular telephone network to convey wireless communications data and may rely on an iRAT procedure to return to or reselect NR.

Alternatively, at operation 110, cellular radio(s) 28 may wait until receiver 34A finishes the NR band scan. If receiver 34A finds or acquires the NR signal during the NR band scan, then receiver 34A may camp on the NR signal, cellular radio(s) 28 may register and connect with NR network 48A, and device 10 may convey wireless data with NR network 48A. If the NR band scan does not find or acquire the NR signal, then receiver 34B may camp on the frequency of the acquired signal of the earlier/slower RAT, cellular radio(s) 28 may register and connect with the corresponding cellular telephone network, and device 10 may convey wireless data with that cellular telephone network.

In the example of operations 110 and 112, the acquired NR signal is an NR/SA signal. For NSA NR signals (e.g., when NR/SA is not supported), receiver 34B may camp on an acquired LTE signal first (e.g., as an anchor) while receiver 34A concurrently performs the NR band scan. If LTE is unavailable, then receiver 34B may perform a 3G band scan and then a 2G band scan until a signal is acquired and may revert to LTE when 4G network 48B becomes available (e.g., to serve as the anchor).

The examples of FIGS. 3 and 4 in which receiver 34A and receiver 34B perform concurrent system selection using a single SIM 36 are illustrative and non-limiting. If desired, receiver 34A and receiver 34B may perform concurrent system selection using respective SIMs such as SIM 36A and SIM 36B of FIG. 1. SIM 36A and SIM 36B may be associated with the same cellular network carrier or may be associated with different respective cellular network carriers.

Figure 5:
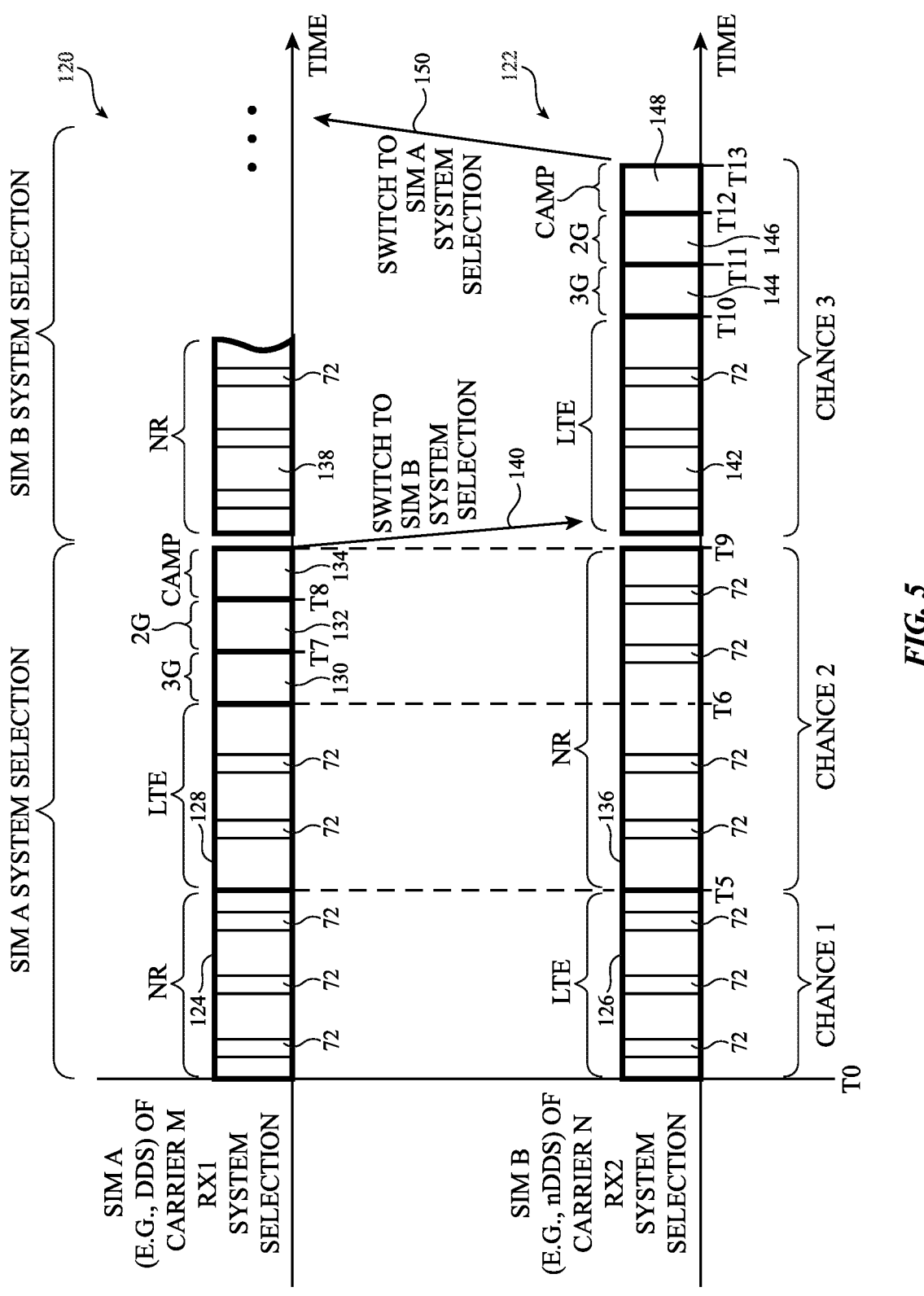
FIG. 5 includes illustrative timing diagrams showing how first and second receivers may concurrently perform system selection from different wireless technologies using first and second SIMs associated with different cellular network carriers in accordance with some embodiments.

FIG. 5 depicts timing diagrams (e.g., for one system selection period (SSP)) showing one example of how receiver 34A and receiver 34B may concurrently perform system selection using SIMs 36A and 36B associated with different respective cellular network carriers (e.g., in an MSIM or DSDS mode). As shown in FIG. 5, timing diagram 120 charts the system selection procedure that may be performed by receiver 34A (RX1) using a corresponding SIM 36A (e.g., a DDS) associated with a first cellular network carrier M. Timing diagram 122 charts the system selection procedure that may be performed by receiver 34B (RX2) using a corresponding SIM 36B (e.g., an nDDS) associated with a second cellular network carrier N that is different from first cellular network carrier M. The diagramed system selection procedures may be performed while processing operation 62 of FIG. 2, for example.

As shown in FIG. 5, the system selection period may include a first system selection subperiod for SIM 36A (e.g., a DDS SS period) between times T0 and T9 and then a second system selection subperiod for SIM 36B (e.g., an nDDS SS period) between times T9 and T13. During the first system selection subperiod for SIM 36A, receiver 34A may begin to perform an NR band scan using SIM 36A (e.g., a DDS NR SS) at time T0 lasting for a predetermined duration until time T5 (block 124). Receiver 34B may concurrently perform an LTE band scan using SIM 36B at block 126 (e.g., an nDDS LTE SS). This represents a first chance to acquire an NR signal that supports maximum data rates.

If no NR signal is acquired by receiver 34A during the NR band scan (block 124) and no LTE signal is acquired by receiver 34B during the concurrent LTE band scan (block 126), receiver 34A may begin to perform an LTE band scan using SIM 36A (e.g., a DDS LTE SS) at time T5 lasting for a predetermined duration until time T6 (block 128).

Receiver 34B may concurrently perform an NR band scan using SIM 36B at block 136 (e.g., an nDDS NR SS). This represents a second chance to acquire an NR signal that supports maximum data rates. If no LTE signal is acquired by receiver 34A during the LTE band scan (block 128), receiver 34A may use SIM 36A to perform a 3G band scan at block 130 between times T6 and T7 (e.g., a DDS 3G SS) while receiver 34B concurrently continues the NR band scan of block 136. If no 3G signal is acquired by receiver 34A during the 3G band scan (block 130), receiver 34A may use SIM 36A to perform a 2G band scan at block 132 between times T7 and T8 (e.g., a DDS 2G SS) while receiver 34B concurrently continues the NR band scan of block 136. If receiver 34A acquires a signal during blocks 128-132, receiver 34A may camp on the frequency of the acquired signal until the end of the NR band scan of receiver 34B (time T9), as shown in FIG. 5 by block 134.

Once receiver 34B has finished the NR band scan of block 136 (at time T9), receivers 34A and 34B may switch to the second system selection subperiod for SIM 36B (e.g., an nDDS SS period) as shown by arrow 140. During the second system selection subperiod for SIM 36B, receiver 34A may begin to perform another NR band scan using SIM 36A (e.g., a DDS NR SS) at or after time T9 lasting for a predetermined duration (e.g., until time T13 or the end of the second system selection subperiod). Receiver 34B may concurrently perform an LTE band scan using SIM 36B at block 142 until time T10 (e.g., an nDDS LTE SS). This represents a third chance to acquire an NR signal that supports maximum data rates.

Unlike the first chance performed during the first system selection subperiod for SIM 36A (from times T0 to T5), receiver 34B may sweep through legacy RATs according to its priority list if no LTE signal is acquired during block 142. For example, if no LTE signal is acquired by receiver 34B during the LTE band scan (block 142) and no NR signal has yet been acquired by receiver 34A during the concurrent NR band scan (block 138), receiver 34B may begin to perform a 3G band scan using SIM 36B (e.g., an nDDS 3G SS) at time T10 lasting for a predetermined duration until time T11 (block 144). Receiver 34A may continue to concurrently perform an NR band scan using SIM 36A at block 138. If no 3G signal is acquired by receiver 34B during the 3G band scan (block 144), receiver 34B may use SIM 36B to perform a 2G band scan at block 146 between times T11 and T12 (e.g., an nDDS 2G SS) while receiver 34A concurrently continues the NR band scan of block 138. If receiver 34B acquires a signal during blocks 142-146, receiver 34B may camp on the frequency of the acquired signal until the end of the NR band scan of receiver 34A (time T13), as shown in FIG. 5 by block 148. If no signal has been acquired, processing may revert to the first system selection subperiod for SIM 36A as shown by arrow 150 (e.g., the system selection period may begin again). This functions essentially like splitting the SSIM procedure of FIG. 3 between SIMs 36A and 36B and then swapping SIMs during the second chance.

Figure 6:
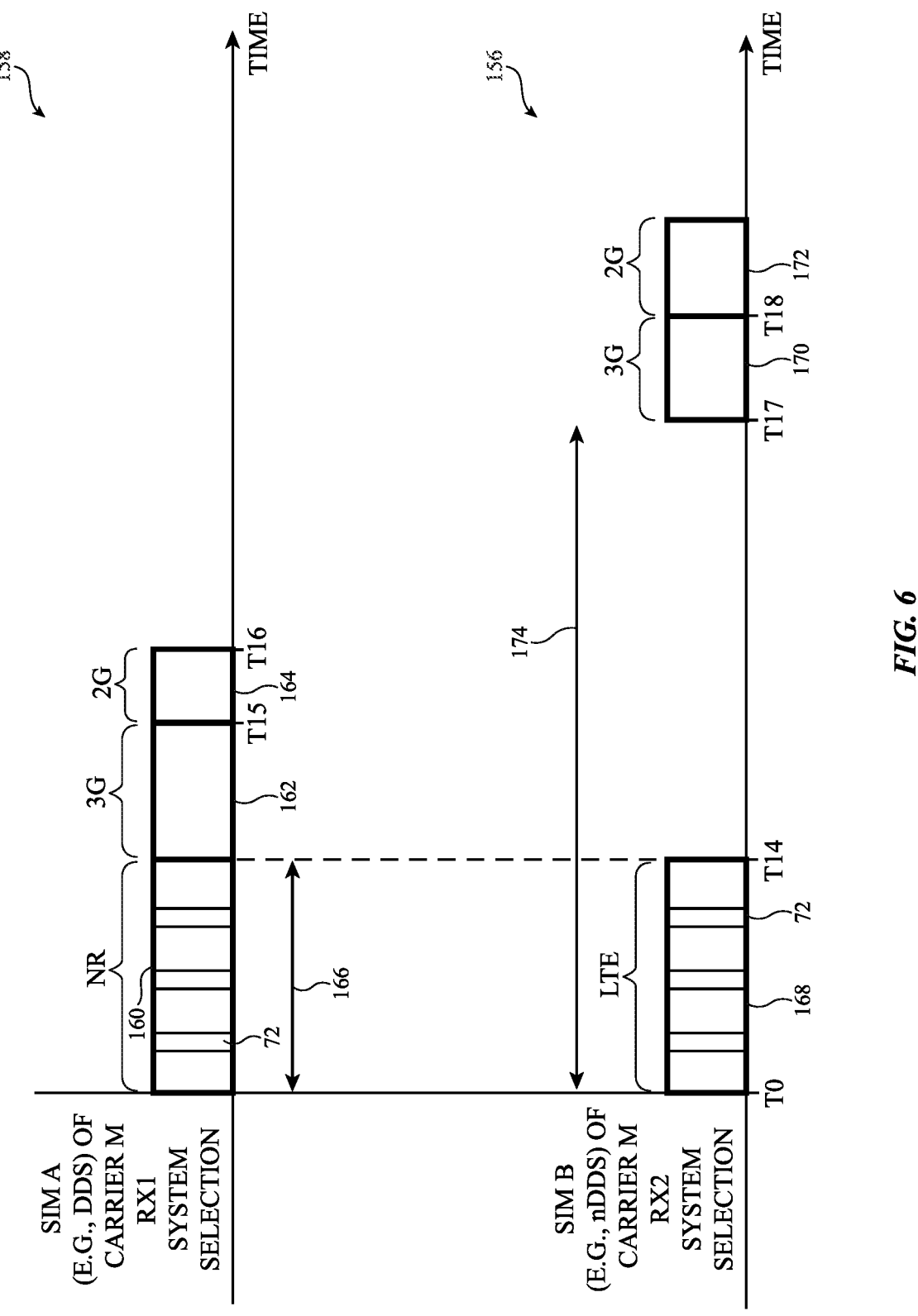
FIG. 6 includes illustrative timing diagrams showing how first and second receivers may concurrently perform system selection from different wireless technologies using first and second SIMs associated with the same cellular network carrier in accordance with some embodiments.

Each of the NR band scans and LTE band scans of FIG. 5 (e.g., blocks 124, 128, 126, 136, 138, and 142) may include one or more SLS periods 72. The example of FIG. 5 in which SIMs 36A and 36B are associated with separate cellular network carriers is illustrative and non-limiting. If desired, SIMs 36A and 36B may be associated with the same cellular network carrier. FIG. 6 depicts timing diagrams (e.g., for one system selection period (SSP)) showing one example of how receiver 34A and receiver 34B may concurrently perform system selection using SIMs 36A and 36B associated with the same cellular network carrier (e.g., in an MSIM or DSDS mode).

As shown in FIG. 6, timing diagram 158 charts the system selection procedure that may be performed by receiver 34A (RX1) using a corresponding SIM 36A (e.g., a DDS) associated with cellular network carrier M. Timing diagram 156 charts the system selection procedure that may be performed by receiver 34B (RX2) using a corresponding SIM 36B (e.g., an nDDS) associated with the same cellular network carrier M. The diagramed system selection procedures may be performed while processing operation 62 of FIG. 2, for example.

In some implementations, receiver 34A may use SIM 36A to perform an NR band scan (or a band scan over any other first RAT) and then, if no NR signal (or signal of the first RAT) is acquired, to perform an LTE band scan (or a band scan over any second and additional RATs) and so on according to its priority list of earlier/slower RATs. Only once receiver 34A has finished each of its band scans will receiver 34B begin to use SIM 36B to perform an LTE band scan and so on according to its priority list of RATs. The implementation of FIG. 6 greatly reduces the system selection time relative to such implementations by utilizing concurrent band scans with receivers 34A and 34B.

As shown in FIG. 6, receiver 34A may begin to perform an NR band scan using SIM 36A (e.g., a DDS NR SS) at time T0 lasting for a predetermined duration until time T14 (block 160). Receiver 34B may concurrently perform an LTE band scan using SIM 36B at block 168 (e.g., an nDDS LTE SS). This represents a first chance to acquire an NR signal that supports maximum data rates.

If no NR signal is acquired by receiver 34A during the NR band scan (block 160) but an LTE signal is acquired by receiver 34B during the concurrent LTE band scan (block 168), receiver 34A may begin to perform a 3G band scan using SIM 36A (e.g., a DDS 3G SS) at time T14 lasting for a predetermined duration until time T15 (block 162). Receiver 34A need not perform an LTE band scan because receiver 34B has already acquired the LTE signal and identified its frequency and receivers 34A and 34B both operate using SIMs of the same carrier M in this example. If no 3G signal is acquired by receiver 34A during the 3G band scan (block 162), receiver 34A may begin to perform a 2G band scan using SIM 36A (e.g., a DDS 2G SS) at time T15 lasting for a predetermined duration until time T16 (block 164). After duration 174 (e.g., an nDDS SS time), receiver 34B may use SIM 36B to perform a 3G band scan beginning at time T17 (block 170) and then a 2G band scan beginning at time T18 (block 172).

By using receiver 34B to perform nDDS LTE SS concurrent with using receiver 34A to perform DDS NR SS, if receiver 34B acquires an LTE signal then receiver 34A need not perform an LTE band scan, reducing the DDS SS time to duration 166. Duration 166 is shorter than the duration required when receiver 34B otherwise waits for receiver 34A to finish running through band scans along its priority list before receiver 34B begins an LTE band scan. This also serves to reduce the nDDS SS time (duration 174), since receiver 34B does not wait for receiver 34A to finish band scanning over its RATs before performing an LTE band scan. Each of the NR band scans and LTE band scans of FIG. 6 (e.g., blocks 166 and 168) may include one or more SLS periods 72.

Figure 7:
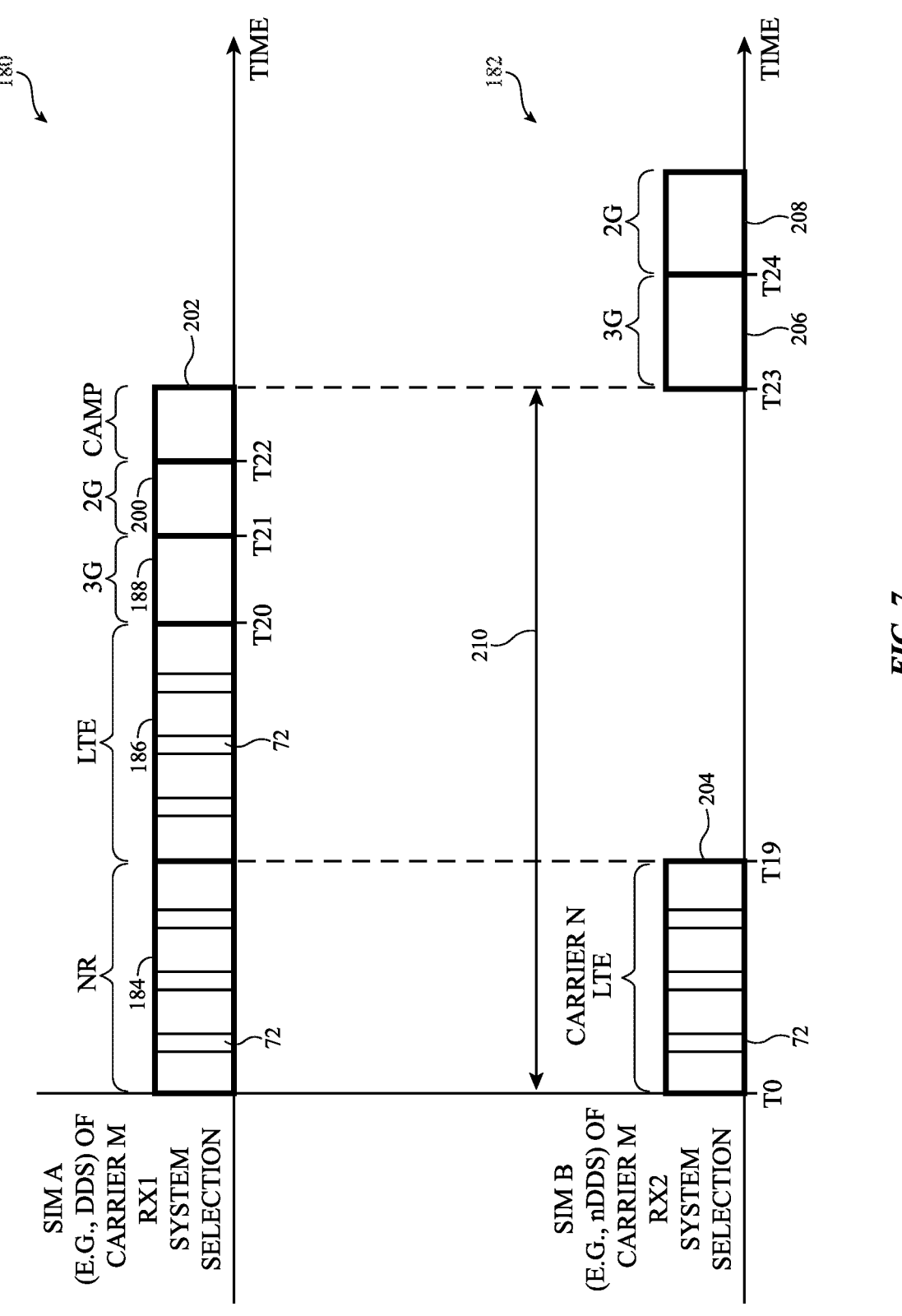
FIG. 7 includes illustrative timing diagrams showing how first and second receivers may concurrently perform system selection from different wireless technologies using a first SIM associated with a cellular network carrier that supports 5G New Radio (NR) communications and using a second SIM associated with a cellular network carrier that does not support 5G NR communications in accordance with some embodiments.

FIG. 7 depicts timing diagrams showing one example of how receiver 34A and receiver 34B may concurrently perform system selection using SIMs 36A and 36B associated with different cellular network carriers (e.g., in an MSIM or DSDS mode), where the cellular network carrier of SIM 36B does not support NR communications (e.g., for one system selection period (SSP)).

As shown in FIG. 7, timing diagram 180 charts the system selection procedure that may be performed by receiver 34A (RX1) using a corresponding SIM 36A (e.g., a DDS) associated with a first cellular network carrier M. Timing diagram 182 charts the system selection procedure that may be performed by receiver 34B (RX2) using a corresponding SIM 36B (e.g., an nDDS) associated with a second cellular network carrier N. The diagramed system selection procedures may be performed while processing operation 62 of FIG. 2, for example.

In some implementations, receiver 34A may use SIM 36A to perform an NR band scan and then, if no NR signal is acquired, to perform an LTE band scan and so on according to its priority list of RATs. Only once receiver 34A has finished each of its band scans will receiver 34B begin to use SIM 36B to perform an LTE band scan and so on according to its priority list of RATs. The implementation of FIG. 7 greatly reduces the system selection time relative to such implementations by utilizing concurrent band scans by receivers 34A and 34B.

As shown in FIG. 7, receiver 34A may begin to perform an NR band scan using SIM 36A (e.g., a DDS NR SS) at time T0 lasting for a predetermined duration until time T19 (block 184). Receiver 34B may concurrently perform an LTE band scan using SIM 36B at block 204 (e.g., an nDDS LTE SS). If no NR signal is acquired by receiver 34A during the NR band scan (block 184), receiver 34A may begin to perform a 3G band scan using SIM 36A (e.g., a DDS 3G SS) at time T19 lasting for a predetermined duration until time T20 (block 186). In this example, receiver 34A still needs to perform an LTE band scan even if receiver 34B acquires an LTE signal during its LTE band scan (block 204) because receiver 34B uses a SIM 36B associated with a different cellular network carrier than the SIM 36A used by receiver 34A. If no LTE signal is acquired by receiver 34A during the LTE band scan (block 186), receiver 34A may begin to perform a 3G band scan using SIM 36A (e.g., a DDS 3G SS) at time T20 lasting for a predetermined duration until time T21 (block 188). If no 3G signal is acquired by receiver 34A during the 3G band scan (block 188), receiver 34A may begin to perform a 2G band scan using SIM 36A (e.g., a DDS 2G SS) at time T21 lasting for a predetermined duration until time T22 (block 200). If receiver 34A acquires a signal during blocks 186-200, receiver 34A may camp on the frequency of the acquired signal until the end of duration 210 (time T23), as shown by block 202.

After duration 210 has elapsed since time T0 (e.g., an nDDS SS time), receiver 34B may use SIM 36B to perform a 3G band scan beginning at time T23 (block 206) and then a 2G band scan beginning at time T24 (block 208). By using receiver 34B to perform nDDS LTE SS (e.g., the LTE band scan) concurrent with using receiver 34A to perform DDS NR SS (e.g., the NR band scan), if receiver 34B acquires an LTE signal during its LTE band scan then receiver 34B does not need to wait for receiver 34A to finish band scanning over its RATs before beginning the LTE band scan. This may serve to reduce the nDDS SS time (duration 210), whereas both the DDS SS time and the nDDS SS time may be reduced in the example of FIG. 6. Each of the NR band scans and LTE band scans of FIG. 7 (e.g., blocks 184, 186, and 204) may include one or more SLS periods 72.

Figure 8:
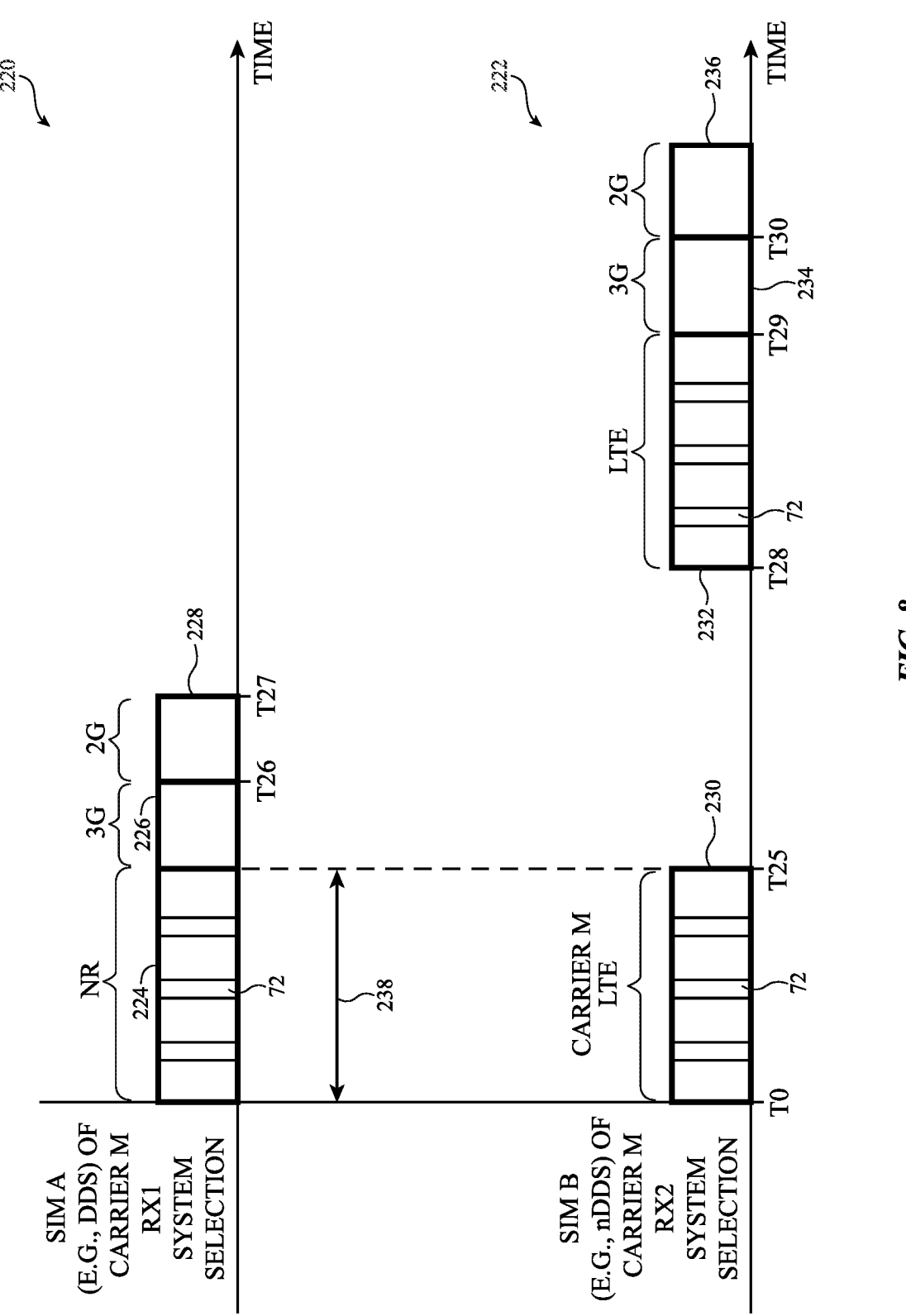
FIG. 8 includes illustrative timing diagrams showing how first and second receivers may concurrently use a first SIM associated with a first cellular network carrier to assist system selection using a second SIM associated with a second cellular network carrier in accordance with some embodiments.

If desired, the nDDS associated with carrier N in the example of FIG. 7 (e.g., SIM 36B) may be used to facilitate or assist the DDS SS performed by receiver 34A using SIM 36A. FIG. 8 depicts timing diagrams showing one example of how receiver 34A and receiver 34B may concurrently perform system selection using SIMs 36A and 36B associated with different cellular network carriers (e.g., in an MSIM or DSDS mode), where the cellular network carrier of SIM 36B does not support NR communications and where SIM 36B is used to facilitate DDS SS.

As shown in FIG. 8, timing diagram 220 charts the system selection procedure that may be performed by receiver 34A (RX1) using a corresponding SIM 36A (e.g., a DDS) associated with a first cellular network carrier M. Timing diagram 222 charts the system selection procedure that may be performed by receiver 34B (RX2) using a corresponding SIM 36B (e.g., an nDDS) associated with a second cellular network carrier N. The diagramed system selection procedures may be performed while processing operation 62 of FIG. 2, for example.

As shown in FIG. 8, receiver 34A may begin to perform an NR band scan using SIM 36A (e.g., a DDS NR SS) at time T0 lasting for a predetermined duration until time T25 (block 224). Receiver 34B may concurrently perform an LTE band scan using SIM 36B at block 230 (e.g., an nDDS LTE SS). However, unlike the LTE band scan of block 204 of FIG. 7 (which is an LTE band scan over the frequencies in the LTE bands of cellular network carrier N), the LTE band scan of block 230 in FIG. 8 is an LTE band scan over frequencies in the LTE bands of cellular network carrier M. If receiver 34B acquires an LTE signal during block 230, receiver 34B may store information identifying about the acquired LTE signal (e.g., the frequency of the acquired LTE signal) and/or may provide the information to receiver 34A to use in performing subsequent LTE communications with cellular network carrier M should receiver 34A be unable to acquire an NR signal during block 224.

If no NR signal is acquired by receiver 34A during the NR band scan (block 224) but receiver 34B acquired an LTE signal during its LTE band scan over the LTE frequencies of carrier M (block 230), receiver 34A need not perform an LTE band scan because receiver 34B has already performed that band scan concurrent with the NR band scan performed by receiver 34A. As such, receiver 34A may instead begin to perform a 3G band scan using SIM 36A (e.g., a DDS 3G SS) at time T25 lasting for a predetermined duration until time T26 (block 226). If no 3G signal is acquired by receiver 34A during the 3G band scan (block 226), receiver 34A may begin to perform a 2G band scan using SIM 36A (e.g., a DDS 2G SS) at time T26 lasting for a predetermined duration until time T27 (block 228).

After a predetermined time period has elapsed, receiver 34B may then use SIM 36B to perform an LTE band scan beginning at time T28 (block 232). The LTE band scan of block 232 may be performed over the frequencies of the LTE bands of carrier N, since the previous LTE band scan at block 230 was performed over the frequencies of LTE bands of carrier M to facilitate DDS SS for receiver 34A, carrier M, and SIM 36A. Receiver 34B may then perform a 3G band scan at time T29 (block 234) and a 2G band scan at time T30 (block 236) as needed. In this way, receiver 34B and SIM 36B may sacrifice some nDDS SS time to reduce the DDS SS time for receiver 34A and SIM 36A. Each of the NR band scans and LTE band scans of FIG. 8 (e.g., blocks 224, 230, and 232) may include one or more SLS periods 72.

Figure 9:
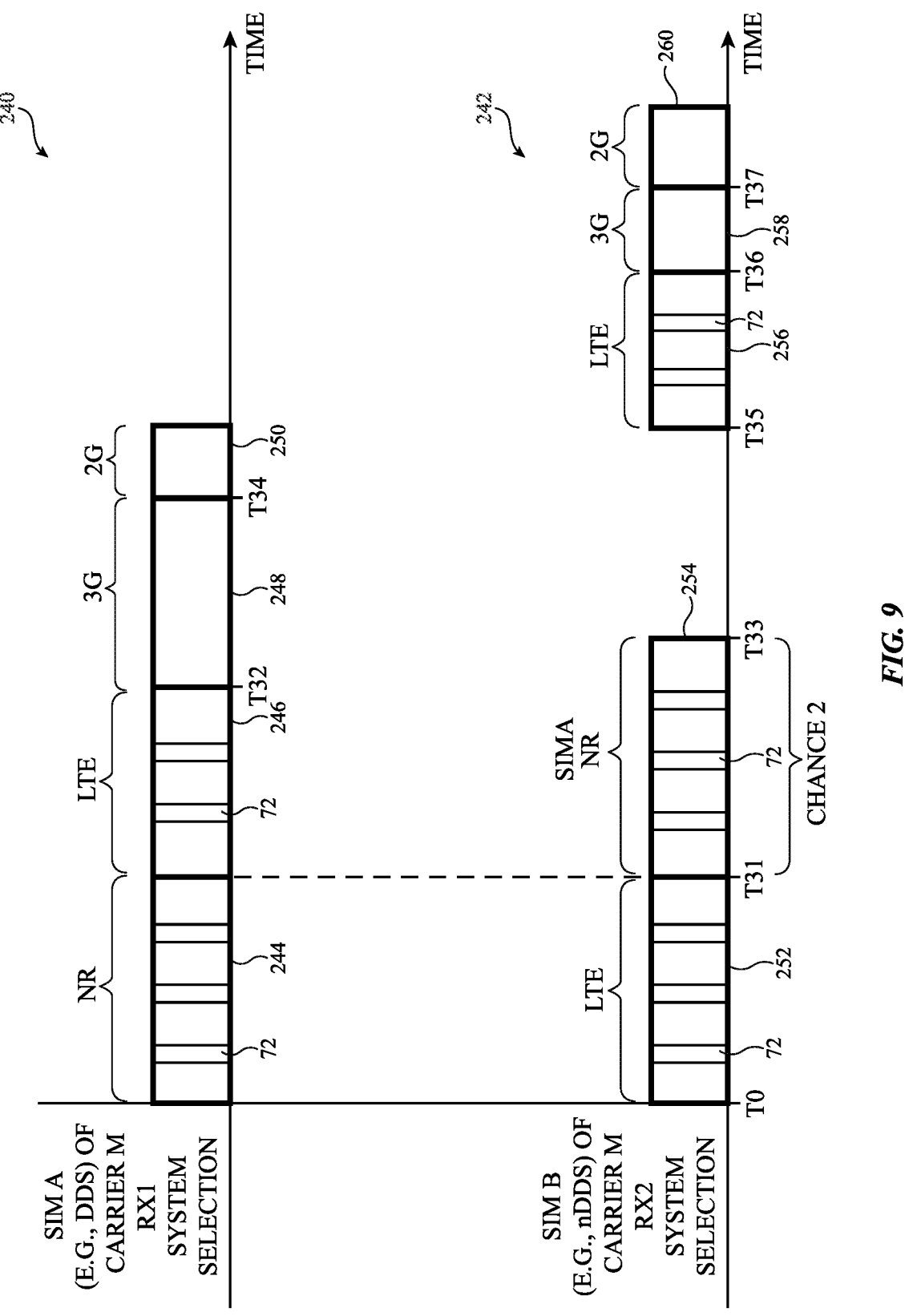
FIG. 9 includes illustrative timing diagrams showing how first and second receivers may concurrently use a first SIM associated with a cellular network carrier to assist system selection using a second SIM associated with the same cellular network carrier in accordance with some embodiments.
Figure 10:
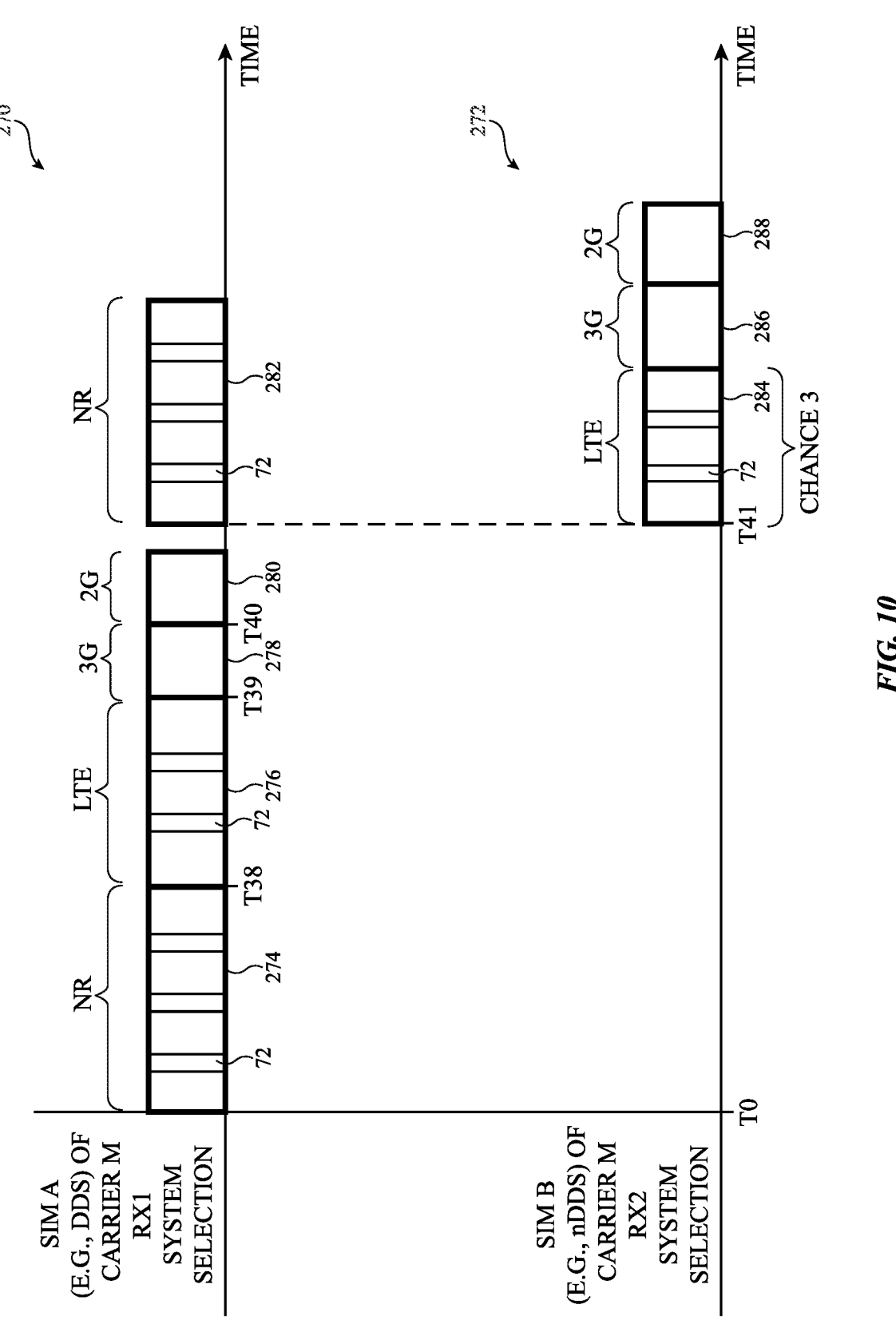
FIG. 10 includes illustrative timing diagrams showing how first and second receivers may concurrently use a SIM associated with a cellular network carrier to perform collaborative system selection during a third chance of a system selection period in accordance with some embodiments.

FIGS. 9 and 10 include timing diagrams showing two examples of how receiver 34A and receiver 34B may concurrently perform system selection using SIMs 36A and 36B associated with the same cellular network carrier M that supports NR communications (e.g., in an MSIM or DSDS mode). FIG. 9 includes timing diagrams showing an example in which receiver 34B and SIM 36B facilitate NR system selection for receiver 34A and SIM 36A during a second chance of the system selection period (e.g., when no NR signal or LTE signal were acquired during the first chance of the system selection period).

As shown in timing diagram 240 of FIG. 9, receiver 34A may begin to perform an NR band scan using SIM 36A (e.g., a DDS NR SS) at time T0 lasting for a predetermined duration until time T31 (block 244). As shown in timing diagram 242 of FIG. 9, receiver 34B may concurrently perform an LTE band scan using SIM 36B at block 252 (e.g., an nDDS LTE SS). This represents a first chance to acquire an NR signal that supports maximum data rates.

If no NR signal is acquired by receiver 34A during the NR band scan (block 244) and no LTE signal is acquired by receiver 34B during the concurrent LTE band scan (block 252), receiver 34A may begin to perform an LTE band scan using SIM 36A (e.g., a DDS LTE SS) at time T31 lasting for a predetermined duration until time T32 (block 246). Receiver 34B may concurrently perform an NR band scan using SIM 36B at block 254 for receiver 34A and carrier 34A (e.g., for the DDS NR SS) rather than for the nDDS NR SS. This may be particularly useful in scenarios where device 10 is in motion, in which case it is possible that device 10 moved to a location with NR coverage after duration T31—T0 has elapsed. If receiver 34B acquires an NR signal during the NR band scan of block 254, receiver 34B may store information about the acquired signal such as the frequency of the acquired signal and/or may provide the information to receiver 34A for use in acquiring the NR signal (e.g., for the DDS NR SS). In other words, the second chance to acquire the NR signal in the system selection period may be dedicated to DDS NR SS rather than to nDDS NR SS. If no LTE signal is acquired by receiver 34A during the LTE band scan (block 246), receiver 34A may use SIM 36A to perform a 3G band scan beginning at time T32 (block 248) and then 2G band scan at time T34 (block 250). After a predetermined time period has elapsed, receiver 34B may use SIM 36B to perform an LTE band scan at time T35 (block 256), and then a 3G band scan at time T36 (block 258), and then a 2G band scan at time T37 (block 260) as needed. This may serve to further reduce the DDS NR SS duration.

FIG. 10 includes timing diagrams showing an example in which receiver 34B and SIM 36B facilitate NR system selection for receiver 34A and SIM 36A during a third chance of the system selection period. As shown in timing diagram 270 of FIG. 10, receiver 34A may begin to perform an NR band scan using SIM 36A (e.g., a DDS NR SS) at time T0 lasting for a predetermined duration until time T38 (block 274). If no NR signal is acquired by receiver 34A during the NR band scan (block 274), receiver 34A may use SIM 36A to perform an LTE band scan at time T38 (block 276), then a 3G band scan at time T39 (block 278), and then a 2G band scan at time T40 (block 280).

At time T41, receiver 34B may use SIM 36B to perform an LTE band scan (block 284), then a 3G band scan (block 286), and then a 2G band scan (block 288) as needed. Receiver 34A may concurrently perform another NR band scan using SIM 36A at block 282 (e.g., a DDS NRSS). This represents a third chance period of the system selection period. Performing the second NR band scan of block 282 may further reduce DDS NR SS time relative to implementations where block 282 is omitted. Each of the NR band scans and LTE band scans of FIGS. 9 and 10 (e.g., blocks 244, 246, 252, 254, 256, 274, 276, 282, and 284) may include one or more SLS periods 72.

The examples of FIGS. 3-10 are illustrative and non-limiting. In general, any desired timing may be used to perform system selection across two or more RATs, where receivers 34A and 34B concurrently perform system selection (e.g., band scans) using the NR RAT (or any other first RAT) and one or more legacy RATs (or any other second and/or subsequent RATs older and/or slower than the first RAT) using one SIM 36 (e.g., in an SSIM mode) or using two SIMs 36A and 36B (e.g., in an MSIM or DSDS mode). Additionally or alternatively, receiver 34A and/or receiver 34B may concurrently perform system selection (e.g., band scans) at different frequencies of the same RAT (e.g., concurrent 5G band scans, concurrent earlier/slower RAT band scans, etc.). In these examples, the second RAT as described herein may be the same RAT as the first RAT and the operations of the second receiver may be performed either by the second receiver or the first receiver. The earlier/slower RATs may be scanned in different orders (e.g., depending on the priority order of the corresponding cellular network carrier or region in which device 10 is located). The RATs described herein need not be cellular telephone RATs and may, in general, be any desired RATs associated with wireless communications (e.g., where receivers 34A and 34B perform concurrent system selection band scans using different RATs). Receivers 34A and 34B may perform the concurrent band scans described herein using one or more of antennas 40 by receiving signals during the band scans using one or more of antennas This may involve receivers 34A and 34B both receiving signals during the band scans over the same antenna(s) 40 or receiving signals during the band scan over different respective antennas 40. Performing concurrent system selection in this way may greatly reduce the amount of time required to connect to the cellular telephone network under a variety of conditions and in a variety of regions that have different available cellular networks.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-10 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. Wireless circuitry comprising:
a first receiver configured to communicatively couple with one or more antennas, the first receiver being configured to perform a first band scan of a first radio access technology (RAT) using the one or more antennas; and
a second receiver configured to communicatively couple with the one or more antennas, the second receiver being configured to perform a second band scan of a second RAT using the one or more antennas concurrent with the first receiver performing the first band scan of the first RAT, wherein
the first receiver is configured to perform a third band scan of the second RAT after the first receiver has completed the first band scan and the second receiver has completed the second band scan,
the second receiver is configured to perform a fourth band scan of the first RAT concurrent with the first receiver performing the third band scan of the second RAT, and
the first receiver is configured to acquire a signal of the first RAT that was previously found by the second receiver during the fourth band scan of the first RAT.

2. The wireless circuitry of claim 1, further comprising:
one or more processors configured to use the one or more antennas to establish cellular communications with a wireless base station using the first RAT based on a signal acquired by the first receiver during the first band scan.

3. The wireless circuitry of claim 1, wherein the first RAT comprises a Fifth Generation (5G) New Radio (NR) RAT and wherein the second RAT comprises the 5G NR RAT, a Fourth Generation (4G) Long-Term Evolution (LTE) RAT, a Third Generation (3G) Wideband Code Division Multiple Access (WCDMA), or a Second Generation (2G) Global System for Mobile Communications (GSM) RAT.

4. The wireless circuitry of claim 1, further comprising:
a subscriber identity module (SIM), wherein the first receiver is configured to perform the first band scan using the SIM and the second receiver is configured to perform the second band scan using the SIM.

5. The wireless circuitry of claim 1, further comprising:
a first subscriber identity module (SIM), wherein the first receiver is configured to perform the first band scan using the first SIM; and
a second SIM, wherein the second receiver is configured to perform the second band scan using the second SIM.

6. The wireless circuitry of claim 5, wherein the first SIM comprises a dedicated data SIM (DDS) and the second SIM comprises a non-dedicated-data SIM (nDDS).

7. The wireless circuitry of claim 5, wherein the first SIM is associated with a first cellular network carrier and the second SIM is associated with a second cellular network carrier that is different from the first cellular network carrier.

8. The wireless circuitry of claim 7 wherein the second band scan includes a sweep over frequencies associated with the second cellular network carrier, the third band scan including a sweep over frequencies associated with the first cellular network carrier.

9. The wireless circuitry of claim 5, wherein the first SIM is associated with a cellular network carrier and the second SIM is associated with the cellular network carrier.

10. A method of operating wireless circuitry to establish cellular communications with a wireless base station, the method comprising:

listening, using a first receiver beginning at a first time and ending at a second time, for radio-frequency signals of a first radio access technology (RAT) while sweeping over first frequencies associated with the first RAT; and listening, using a second receiver beginning at the first time and ending at the second time, for radio-frequency signals of a second RAT that is different from the first RAT while sweeping over second frequencies associated with the second RAT.

11. The method of claim 10, wherein the first RAT has a higher maximum data rate than the second RAT, the method further comprising:

acquiring, using the first receiver, a first signal of the first RAT while sweeping over the first frequencies.

12. The method of claim 11, further comprising:

acquiring, using the second receiver, a second signal of the second RAT while sweeping over the second frequencies; and establishing cellular communications with the wireless base station using the first RAT when the first receiver acquires the first signal prior to the second receiver acquiring the second signal.

13. The method of claim 12, further comprising:

when the second receiver acquires the second signal prior to the first receiver acquiring the first signal, camping the second receiver on a frequency of the second signal concurrent with the first receiver continuing to listen for the radio-frequency signals of the first RAT while sweeping over the first frequencies.

14. The method of claim 12, further comprising:

when the second receiver acquires the second signal prior to the first receiver acquiring the first signal, establishing cellular communications with the wireless base station using the second RAT after the first receiver has finished sweeping over the first frequencies.

15. A method of operating wireless circuitry to establish cellular communications with a wireless base station, the method comprising:

performing, using a first receiver, a first band scan of a first radio access technology (RAT);

performing, using a second receiver, a second band scan of a second RAT concurrent with the first receiver performing the first band scan of the first RAT;

performing, using the first receiver, a third band scan of the second RAT after the first receiver has completed the first band scan and the second receiver has completed the second band scan;

performing, using the second receiver, a fourth band scan of the first RAT concurrent with the first receiver performing the third band scan of the second RAT; and acquiring, using the first receiver, a signal of the first RAT that was previously found by the second receiver during the fourth band scan of the first RAT.

16. The method of claim 15, wherein performing the first band scan and the third band scan comprises performing the first band scan and the third band scan using a dedicated data SIM (DDS) and wherein performing the second band scan and the fourth band scan comprises performing the second band scan and the fourth band scan using a non-dedicated-data SIM (nDDS).

17. The method of claim 16, wherein DDS is associated with a first cellular network carrier and the nDDS is associated with a second cellular network carrier that is different from the first cellular network carrier.

18. The method of claim 15, wherein the first RAT comprises a Fifth Generation (5G) New Radio (NR) RAT and wherein the second RAT comprises a Fourth Generation (4G) Long-Term Evolution (LTE) RAT.

19. The method of claim 15, wherein the first RAT comprises a Fifth Generation (5G) New Radio (NR) RAT and the second RAT comprises a Third Generation (3G) Wideband Code Division Multiple Access (WCDMA) RAT.

20. The method of claim 15, wherein the first RAT comprises a Fourth Generation (4G) Long-Term Evolution (LTE) RAT and the second RAT comprises a Second Generation (2G) Global System for Mobile Communications (GSM) RAT.

* * * * *